United States Patent
Kimura et al.

(10) Patent No.: US 10,644,621 B2
(45) Date of Patent: May 5, 2020

(54) ROTATING ELECTRIC MACHINE APPARATUS

(71) Applicant: DENSO CORPORATION, Kariya, Aichi-pref. (JP)

(72) Inventors: Asaka Kimura, Kariya (JP); Makoto Taniguchi, Kariya (JP); Keiji Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/317,974

(22) PCT Filed: Jul. 13, 2017

(86) PCT No.: PCT/JP2017/025563
§ 371 (c)(1),
(2) Date: Jan. 15, 2019

(87) PCT Pub. No.: WO2018/012592
PCT Pub. Date: Jan. 18, 2018

(65) Prior Publication Data
US 2019/0238073 A1    Aug. 1, 2019

(30) Foreign Application Priority Data

Jul. 15, 2016 (JP) .................................. 2016-140807

(51) Int. Cl.
*H02P 6/10* (2006.01)
*H02P 25/18* (2006.01)
(Continued)

(52) U.S. Cl.
CPC ................ *H02P 6/10* (2013.01); *H02K 3/28* (2013.01); *H02P 6/153* (2016.02); *H02P 25/18* (2013.01);
(Continued)

(58) Field of Classification Search
CPC ................................... H02P 6/10; H02P 6/153
(Continued)

(56) References Cited

U.S. PATENT DOCUMENTS 8,786,226 B2 * 7/2014 Vollmer .................. B60L 3/003
318/400.02

FOREIGN PATENT DOCUMENTS

JP     H11-332288 A     11/1999
JP     H11-356082 A     12/1999

OTHER PUBLICATIONS

Sep. 26, 2017 International Search Report issued in International Patent Application No. PCT/JP2017/025563.

* cited by examiner

*Primary Examiner* — David Luo
(74) *Attorney, Agent, or Firm* — Oliff PLC

(57) ABSTRACT

A rotating electric machine apparatus includes a rotating electric machine and a full-bridge inverter. The full-bridge inverter includes first high-side switches, first low-side switches, second high-side switches, and second low-side switches. The rotating electric machine apparatus includes: first and second neutral point switches; a full-wave driving unit that performs a full-wave driving process in which switching control of the switches is performed in a state in which the first and second neutral point switches are turned off; a half-wave driving unit that performs a half-wave driving process in which switching control of the first high-side switches and the second low-side switches is performed in a state in which the first and second neutral point switches are turned on, and the first low-side switches and the second high-side switches are turned off; and an executing unit that selects and performs either of the full-wave driving process and the half-wave driving process.

20 Claims, 13 Drawing Sheets

(51) Int. Cl.
*H02P 25/22* (2006.01)
*H02K 3/28* (2006.01)
*H02P 27/06* (2006.01)
*H02P 6/15* (2016.01)

(52) U.S. Cl.
CPC .............. *H02P 25/22* (2013.01); *H02P 27/06* (2013.01); *H02P 2207/055* (2013.01); *H02P 2209/01* (2013.01)

(58) Field of Classification Search
USPC .................. 318/400.14, 400.13, 400.01, 700
See application file for complete search history.

ROTATING ELECTRIC MACHINE APPARATUS

CROSS-REFERENCE TO RELATED APPLICATIONS

The present application is based on Japanese Patent Application No. 2016-140807, filed on Jul. 15, 2016, the descriptions of which are incorporated herein by reference.

TECHNICAL FIELD

The present disclosure relates to a rotating electric machine apparatus that is mounted in a vehicle, such as a passenger car or a commercial vehicle, and includes a rotating electric machine and a full-bridge inverter that performs electric power transfer with the rotating electric machine.

BACKGROUND ART

In the rotating electric machine that configures this type of apparatus, in cases in which a rotation-speed range over which the rotating electric machine is used as an electric motor is wide, required performance of the rotating electric machine at each of a low-speed range and a high-speed range is required to be obtained. For example, obtaining of the required performance through use of a configuration in which a direct-current to direct-current (DCDC) converter is provided in an onboard system, and the rotating electric machine is driven while the DCDC converter varies a voltage applied to the rotating electric machine can be considered. However, because this configuration is costly, an issue in that the configuration is not economical arises.

In addition, for example, actualization of the required performance through use of a configuration in which stator winding characteristics of the rotating electric machine are switched to high-speed-type characteristics, such as a delta connection, or high-torque-type characteristics, such as a star connection, during operation of the rotating electric machine can be considered. However, in this configuration, issues in that the configuration for switching the stator winding characteristics is complex and the operation of the rotating electric machine is required to be temporarily stopped during switching of the stator winding characteristics arise.

Therefore, as can be seen in PTL 1 and PTL 2, described below, as a method for actualizing the required performance of the rotating electric machine at each of the low-speed range and the high-speed range with a simple configuration, a method in which a full-wave driving process is performed at the low-speed range and a half-wave driving process is performed at the high-speed range is known.

CITATION LIST

Patent Literature

[PTL 1] JP-A-H11-332288
[PTL 2] JP-A-H11-356082

SUMMARY OF INVENTION

However, when the rotating electric machine is driven in the half-wave driving process, torque ripple in the rotating electric machine increases.

The main object of the present disclosure is to provide a rotating electric machine apparatus that is capable of reducing torque ripple during a half-wave driving process with a simple configuration.

The means for solving the above-described issues and the working effects thereof will be described below.

A first disclosure provides a rotating electric machine apparatus that includes a rotating electric machine and a full-bridge inverter that performs electric power transfer with the rotating electric machine. The rotating electric machine includes: a first coil of each of N phases that is wound around a stator core and is connected by a star connection, N being an integer of 2 or more; and a second coil of each of N phases that is wound around the stator core while being electrically insulated from the first coil and is connected by a star connection. The full-bridge inverter includes: a first inverter that includes series-connection bodies of each of N phases including first high-side switches and first low-side switches, in which a connection point between the first high-side switch and the first low-side switch is connected to, of both ends of the first coil, a side opposite a neutral point side of the first coil; and a second inverter that includes series-connection bodies of each of N phases including second high-side switches and second low-side switches, in which a connection point between the second high-side switch and the second low-side switch is connected to, of both ends of the second coil, a side opposite a neutral point side of the second coil.

In addition, the first disclosure includes: a first neutral point switch that connects, of both ends of the first low-side switch, a side opposite the connection point with the first high-side switch and the neutral point of the first coil; a second neutral point switch that connects, of both ends of the second high-side switch, a side opposite the connection point with the second low-side switch and the neutral point of the second coil; a full-wave driving unit that performs a full-wave driving process in which switching control of the first high-side switches, the first low-side switches, the second high-side switches, and the second low-side switches is performed in a state in which the first neutral point switch and the second neutral point switch are turned off; a half-wave driving unit that performs a half-wave driving process in which switching control of the first high-side switches and the second low-side switches is performed in a state in which the first neutral point switch and the second neutral point switch are turned on, and the first low-side switches and the second high-side switches are turned off; and an executing unit that selects and performs either of the full-wave driving process and the half-wave driving process.

The rotating electric machine of the first disclosure is a double-layer winding rotating electric machine that includes the first and second coils of each of N phases. The first coil and the second coil are electrically insulated.

In addition, the first disclosure includes the first neutral point switch and the second neutral point switch. The first neutral point switch connects the neutral point of the first coil with, of both ends of the first low-side switch, the side opposite the connection point with the first high-side switch. The second neutral point switch connects the neutral point of the second coil with, of both ends of the second high-side switch, the side opposite the connection point with the second low-side switch.

Furthermore, the first disclosure includes the full-wave driving unit that performs the full-wave driving process and the half-wave driving unit that performs the half-wave driving process. The executing unit selects and performs either of the full-wave driving process and the half-wave driving process. The full-wave driving process is a process in which switching control of the first high-side switches and the first low-side switches configuring the first inverter, and the second high-side switches and the second low-side switches configuring the second inverter is performed in a state in which the first neutral point switch and the second neutral point switch are turned off Meanwhile, the half-wave driving process includes a process in which switching control of the first high-side switches is performed in a state in which the first neutral point switch is turned on and the first low-side switches are turned off. As a result of this process, a current flows in a direction from the first high-side switch side towards the neutral point side in the first coil of each phase.

In addition, the half-wave driving process includes a process in which switching control of the second low-side switches is performed in a state in which the second neutral point switch is turned on and the second high-side switches are turned off. As a result of this process, a current flows in a direction from the neutral point side towards the second low-side switch side in the second coil of each phase.

As a result of the half-wave driving process, a current flow direction of the first coil and a current flow direction of the second coil become opposite with reference to the neutral point. As a result, torque can be generated such that torque ripple in the rotating electric machine is reduced. Therefore, as a result of the first disclosure, torque ripple in the rotating electric machine when the half-wave driving process is performed can be reduced with a simple configuration in which the neutral point switches are provided, while effectively using the double-layer winding rotating electric machine.

Here, specifically, as in a second disclosure, the half-wave driving unit performs energization control of the first high-side switches at every single electrical angle period over a first predetermined period that is equal to or less than an electrical angle half period for each of the N phases, while shifting start timings for energization control of the first high-side switches for each of the N phases. In addition, the half-wave driving unit performs energization control of the second low-side switches at every single electrical angle period over a second predetermined period that is equal to or less than the electrical angle half period for each of the N phases, while shifting start timings for energization control of the second low-side switches for each of the N phases.

In addition, more specifically, as in a third disclosure, the half-wave driving unit performs energization control of the first high-side switches while shifting the start timings for energization control of the first high-side switches by "360 degrees/N" for each of the N phases, and performs energization control of the second low-side switches while shifting the start timings for energization control of the second low-side switches by "360 degrees/N" for each of the N phases.

In a fourth disclosure, the first predetermined period and the second predetermined period are each set to a period that is "90 degrees+180 degrees/N" or greater and the electrical angle half period or less.

When the energization periods to the first and second coils become short, torque ripple in the rotating electric machine increases. Here, as a result of the settings of the first predetermined period and the second predetermined period in the fourth disclosure, energization periods of the first and second coils based on the number of phases can be ensured. For example, when N=3, each predetermined period is set to a period that is 150 degrees or greater and the electrical angle half period or less. Consequently, the effect of reducing torque ripple in the rotating electric machine can be enhanced.

In a fifth disclosure, the first coil and the second coil are wound around the stator core such that a spatial phase difference between the first coil and the second coil is 0 electrical degrees. The half-wave driving unit performs energization control of the first high-side switches and the second low-side switches while shifting the start timings for energization control of the first high-side switches and the start timings for energization control of the second low-side switches by the electrical angle half period for each of the phases of which the spatial phase coincides.

As a result of the fifth disclosure, for each of the phases of which the spatial phase coincides, the second coil can be energized during the period in which the first coil is not energized. In addition, for each of the phases of which the spatial phase coincides, the first coil can be energized during the period in which the second coil is not energized. Consequently, a minimum value of torque of the rotating electric machine that periodically varies can be raised, and an average torque of the rotating electric machine can be increased.

In the fifth disclosure, when the first and second predetermined periods are set to 180 degrees, an end timing of energization control of the first high-side switch and the start timing of energization control of the second low-side switch coincide for each of the phases of which the spatial phase coincides.

Here, as in a sixth disclosure, the stator core includes a plurality of teeth portions that are formed in a circumferential direction of the stator core such as to be separated at a predetermined interval. The first coil and the second coil are wound around a same teeth portion for each of the N phases. In this case, the phases of which the spatial phase coincides refer to the phases of the first coil and the second coil wound around the same teeth portion among the N phases.

In a seventh disclosure, the half-wave driving unit performs energization control of the first high-side switches such that at least two phases, of the N phases, of the first coil, are simultaneously energized, and performs energization control of the second low-side switches such that at least two phases, of the N phases, of the second coil, are simultaneously energized.

In the seventh disclosure, as a result of the coils of at least two phases being simultaneously energized, torque ripple in the rotating electric machine can be further reduced.

In an eighth disclosure, peak values of currents flowing to the first coil and the second coil are greater when the half-wave driving process is performed, compared to when the full-wave driving process is performed.

The energization periods of the first and second coils when the half-wave driving process is performed are shorter than the energization periods of the first and second coils when the full-wave driving process is performed. Therefore, a heat generation amount of each coil through which a current flows when the half-wave driving process is performed is less than the heat generation amount of each coil through which a current flows when the full-wave driving process is performed. Here, thermal design of each constituent component of an onboard system is made such that reliability does not decrease when the full-wave driving process of which the energization periods are long is performed. Therefore, the heat generation amount of each coil when the half-wave driving process is performed has leeway in relation to an allowable upper-limit value thereof.

Here, in the eighth disclosure, the peak values of the currents flowing to the first coil and the second coil are greater when the half-wave driving process is performed, compared to when the full-wave driving process is performed. Consequently, torque of the rotating electric machine when the half-wave driving process is performed can be increased.

In a ninth disclosure, the first neutral point switch is a first low-side neutral point switch and the second neutral point switch is a second high-side neutral point switch. The ninth disclosure includes: a first high-side neutral point switch that connects, of both ends of the first high-side switch, a side opposite the connection point with the first low-side switch and the neutral point of the first coil; and a second low-side neutral point switch that connects, of both ends of the second low-side switch, a side opposite the connection point with the second high-side switch and the neutral point of the second coil. In the ninth disclosure, the half-wave driving unit performs a process for alternately performing a first mode and a second mode. The first mode is a process in which switching control of the first high-side switches and the second low-side switches is performed in a state in which the first low-side neutral point switch and the second high-side neutral point switch are turned on, and the first high-side neutral point switch, the second low-side neutral point switch, the first low-side switches, and the second high-side switches are turned off. The second mode is a process in which switching control of the first low-side switches and the second high-side switches is performed in a state in which the first high-side neutral point switch and the second low-side neutral point switch are turned on, and the first low-side neutral point switch, the second high-side neutral point switch, the first high-side switches, and the second low-side switches are turned off.

In the ninth disclosure, the first mode and the second mode are alternately performed. Therefore, when the half-wave driving process is performed, the current continuously flowing to the first low-side neutral point switch, the first high-side switches, the second high-side neutral point switch, and the second low-side switches can be prevented. As a result, overheating of the first low-side neutral point switch, the first high-side switches, the second high-side neutral point switch, and the second low-side switches can be prevented.

In a tenth disclosure, the first neutral point switch has a rated current that is greater than respective rated currents of the first high-side switch and the first low-side switch. The second neutral point switch has a rated current that is greater than respective rated currents of the second high-side switch or the second low-side switch.

The currents flowing to each of the first high-side switches of N phases configuring the first inverter may merge at the neutral point of the first coil. Therefore, in the tenth disclosure, the rated current of the first neutral point switch is set to be greater than the respective rated currents of the first high-side switches and the first low-side switches configuring the first inverter. Consequently, reliability of the first neutral point switch can be enhanced.

In addition, the current flowing to the second neutral point switch may be a sum value of the currents flowing to each of the second low-side switches of N phases configuring the second inverter. Therefore, in the tenth disclosure, the rated current of the second neutral point switch is set to be greater than the respective rated currents of the second high-side switches and the second low-side switches configuring the second inverter. Consequently, reliability of the second neutral point switch can be enhanced.

In an eleventh disclosure, the executing unit performs the full-wave driving process when a rotation speed of a rotor of the rotating electric machine is determined to be equal to or less than a first predetermined value, performs the half-wave driving process when the rotation speed of the rotor is determined to exceed the first predetermined value, and switches from the half-wave driving process to the full-wave driving process when determined that the rotation speed of the rotor has fallen below a second predetermined value that is less than the first predetermined value after the rotation speed of the rotor is determined to have temporarily exceeded the first predetermined value.

As a result of the eleventh disclosure, occurrence of frequent switching from one to the other of the half-wave driving process and the full-wave driving process can be prevented.

Here, as in a twelfth disclosure, a rotating electric machine that also functions as a power generator may be used as the rotating electric machine.

BRIEF DESCRIPTION OF DRAWINGS

The above-described object, other objects, characteristics, and advantages of the present disclosure will be further clarified through the detailed description below, with reference to the accompanying drawings. The drawings are as follows.

DESCRIPTION OF EMBODIMENTS

A first embodiment in which a rotating electric machine apparatus of the present disclosure is mounted in a vehicle in which an engine is mounted as a main onboard engine will hereinafter be described with reference to the drawings.

Figure 1:
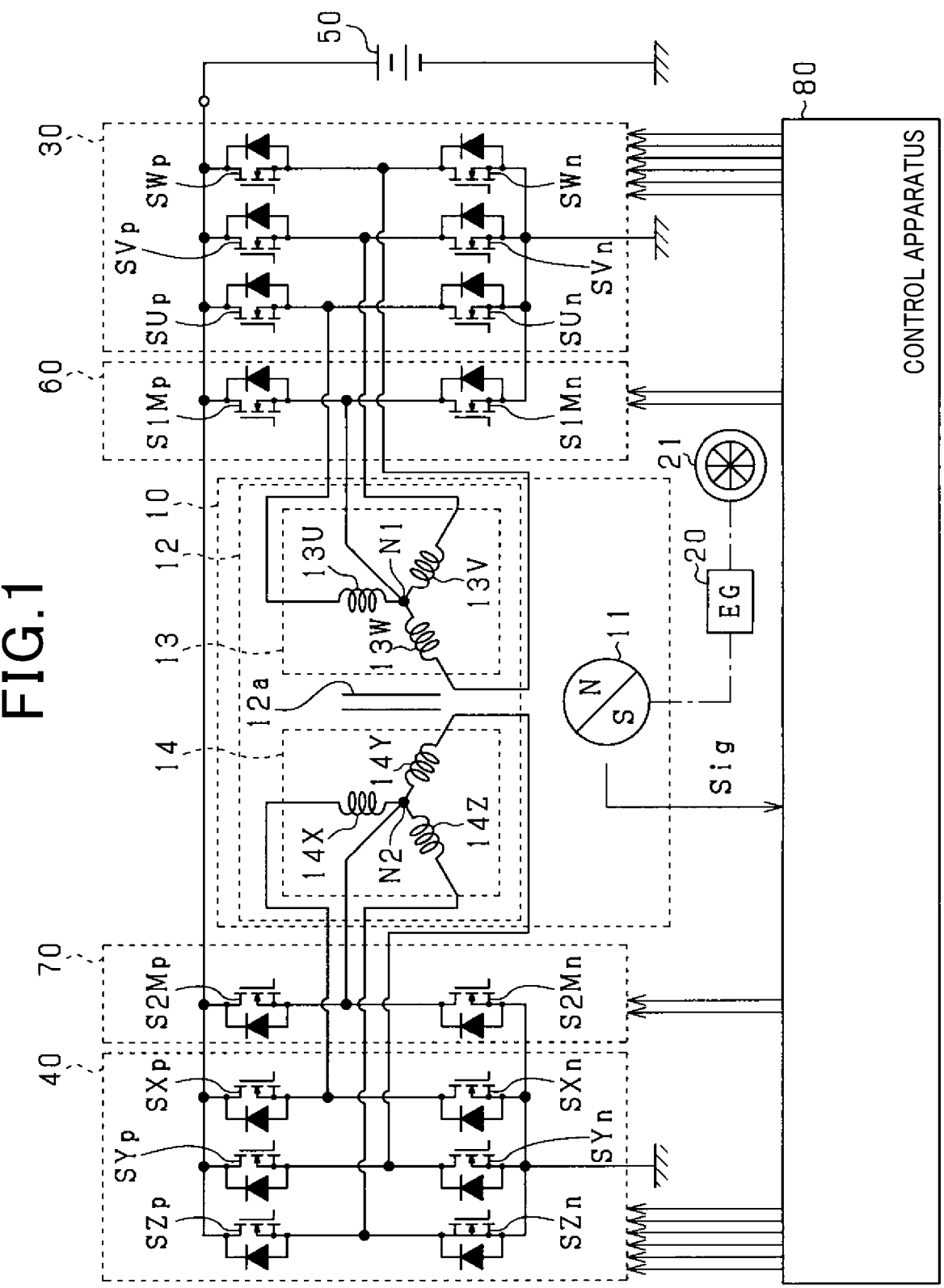
FIG. 1 is an overall configuration diagram of an onboard rotating electric machine apparatus according to a first embodiment.

As shown in FIG. 1, the rotating electric machine apparatus includes a rotating electric machine 10. The rotating electric machine 10 is a rotating electric machine that includes a three-phase double-layer winding. According to the present embodiment, a permanent magnet field-type synchronous motor is used as the rotating electric machine 10. In addition, according to the present embodiment, an integrated starter generator (ISG) that integrates the functions of an electric motor and a power generator is used as the rotating electric machine 10.

A rotor 11 that configures the rotating electric machine 10 includes a permanent magnet and is capable of performing power transmission with an output shaft of an engine 20. Specifically, the rotor 11 is connected to the output shaft via a belt. A drive wheel 21 is connected to the output shaft of the engine 20 via a power transmission path that includes a gearbox and an axle shaft.

A first coil 13 and a second coil 14 are arranged in a stator 12 that configures the rotating electric machine 10. The first coil 13 and the second coil 14 are electrically insulated from each other. The rotor 11 is shared between the first and second coils 13 and 14. The first coil 13 has U-, V-, and W-phase coils 13U, 13V, and 13W that are wound around a stator core 12a. The U-, V-, and W-phase coils 13U, 13V, and 13W are connected by a star connection and are wound around the stator core 12a in a state in which the U-, V-, and W-phase coils 13U, 13V, and 13W are shifted from each other by 120 electrical degrees.

The second coil 14 is wound around the stator core 12a around which the first coil 13 is wound, and has X-, Y-, and Z-phase coils 14X, 14Y, and 14Z. The X-, Y-, and Z-phase coils 14X, 14Y, and 14Z are connected by a star connection and are wound around the stator core 12a in a state in which the X-, Y-, and Z-phase coils 14X, 14Y, and 14Z are shifted from each other by 120 electrical degrees. According to the present embodiment, the number of windings of each coil 13U, 13V, 13W, 14X, 14Y, and 14Z is set to be the same as one another.

Figure 2:
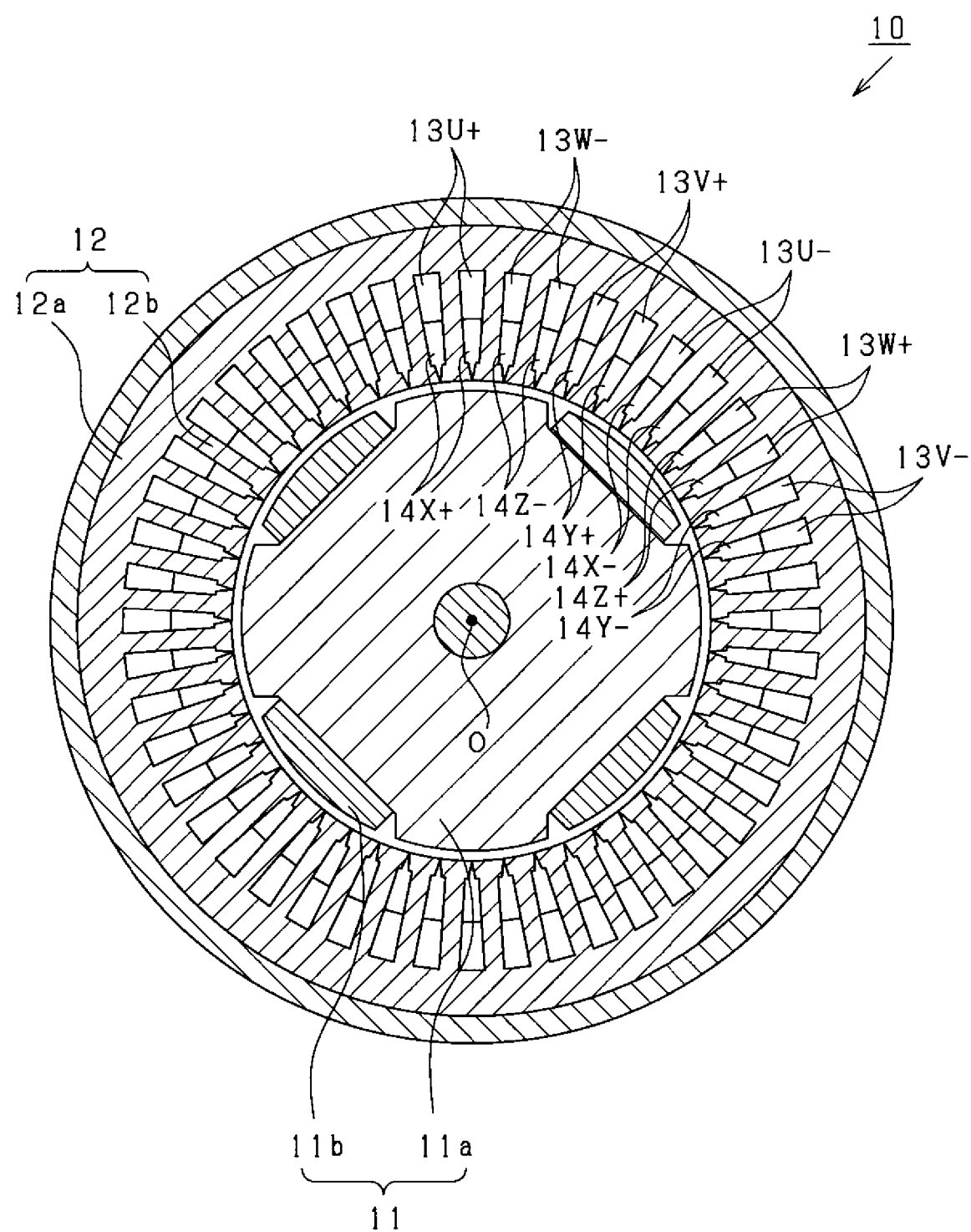
FIG. 2 is a cross-sectional view of a rotating electric machine.

A configuration of the rotating electric machine 10 will be described in detail with reference to FIG. 2. FIG. 2 is a cross-sectional view in which the rotating electric machine 10 is cut on a plane that is orthogonal to a direction of a rotational center axis line O of the rotor 11.

As shown in FIG. 2, the stator core 12a forms an annular shape. A center axis line of the stator core 12a and the rotational center axis line O of the rotor 11 are arranged on a same axis. According to the present embodiment, the rotor 11 is arranged on an inner circumferential side of the stator core 12a such as to freely rotate in relation to the stator core 12a.

The stator core 12a has a plurality of teeth portions 12b that are formed at an equal pitch in a circumferential direction of the stator core 12a. According to the present embodiment, the stator core 12a has 48 teeth portions 12b. Therefore, 48 slots are formed in the stator core 12a by the teeth portions 12b that are adjacent to one another in the circumferential direction.

The rotor 11 includes a rotor core 11a and a permanent magnet 11b. The rotor core 11a is provided with a rotation shaft. The permanent magnet 11b is provided in the rotor core 11b. According to the present embodiment, the permanent magnets 11b of eight poles are provided.

Coils are wound around each of the teeth portions 12b. Specifically, a coil is wound around each of the teeth portions 12b that are arrayed in the circumferential direction of the stator core 12a, in order from a U-phase coil 13U+, a W-phase coil 13W−, a V-phase coil 13V+, a U-phase coil 13U−, a W-phase coil 13W+, to a V-phase coil 13V−. Therefore, each of the coils 13U+, 13W−, 13V+, 13U−, 13W+, and 13V− is arranged in two adjacent slots. Here, "+" and "□" of the coils indicate that the polarities are opposite.

A coil is wound around each of the teeth portions 12b that are arrayed in the circumferential direction of the stator core 12a, in order from an X-phase coil 14X+, Z-phase coil 14Z−, a Y-phase coil 14Y+, an X-phase coil 14X−, a Z-phase coil 14Z+, to a Y-phase coil 14Y−. Therefore, each of the coils 14X+, 14Z−, 14Y+, 14X−, 14Z+, and 14Y− is arranged in two adjacent slots.

According to the present embodiment, with the U-phase coil 13U+ on a radial-direction outer side of the stator core 12a and the X-phase coil 14X+ on a radial-direction inner side, the coils 13U+ and 14X+ are wound around the same teeth portion 12b in a state in which the coils 13U+ and 14X+ are electrically insulated from each other. This similarly applies to a set of the W-phase coil 13W- and the Z-phase coil 14Z−, a set of the V-phase 13V+ and Y-phase coil 14Y+, a set of the U-phase coil 13U- and the X-phase coil 14X−, a set of the W-phase coil 13W+ and the Z-phase coil 14Z+, and a set of the V-phase coil 13V− and the Y-phase coil 14Y−. Therefore, according to the present embodiment, a spatial phase difference formed by the first coil 13 and the second coil 14 is 0 electrical degrees. Hatching of the cross-sectional surface of each coil is omitted in FIG. 2.

Returning to FIG. 1, described above, the rotating electric machine apparatus includes a first inverter 30 and a second inverter 40 that are full-bridge inverters. The first inverter 30 includes series-connection bodies that includes U-, V-, and W-phase high-side switches SUp, SVp, and SWp, and U-, V-, and W-phase low-side switches SUn, SVn, and SWn. A positive terminal of a direct-current power supply 50 is connected to high-potential-side terminals of the U-, V-, and W-phase high-side switches SUp, SVp, and SWp. A negative terminal of the direct-current power supply 50 is connected to the ground. According to the present embodiment, a storage battery is used as the direct-current power supply 50. In addition, according to the present embodiment, a direct-current power supply of which a rated voltage is 12 volts is used as the direct-current power supply 50.

High-potential-side terminals of the U-, V-, and W-phase low-side switches SUn, SVn, and SWn are connected to low-potential-side terminals of the U-, V-, and W-phase high-side switches SUp, SVp, and SWp. Low-potential-side terminals of the W-phase low-side switches SUn, SVn, and SWn are connected to the ground. According to the present embodiment, a voltage-controlled-type semiconductor switching element is used as each of the switches SUp, SVp, SWp, SUn, SVn, and SWn. Specifically, an N-channel metal-oxide-semiconductor field-effect transistor (MOSFET) is used. Therefore, in each switch, the high-potential-side terminal is a drain and the low-potential-side terminal is a source. A body diode is connected in inverse parallel to each of the switches SUp, SVp, SWp, SUn, SVn, and SWn.

First terminals of the U-, V-, and W-phase coils 13U, 13V, and 13W are connected to connection points between the sources of the U-, V-, and W-phase high-side switches SUp, SVp, and SWp and the drains of the U-, V-, and W-phase low-side switches SUn, SVn, and SWn. Second ends of the U-, V-, and W-phase coils 13U, 13V, and 13W are connected by a first neutral point N1.

The second inverter 40 includes series-connection bodies that includes X-, Y-, and Z-phase high-side switches SXp, SVp, and SZp, and X-, Y-, and Z-phase low-side switches SXn, SVn, and SZn. According to the present embodiment, a voltage-controlled-type semiconductor switching element is used as each of the switches SXp, SYp, SZp, SXn, SYn, and SZn. Specifically, an N-channel metal-oxide-semiconductor field-effect transistor (MOSFET) is used. The positive terminal of the direct-current power supply 50 is connected to the drains of the X-, Y-, and Z-phase high-side switches SXp, SVp, and SZp. The sources of the X-, Y-, and Z-phase low-side switches SXn, SVn, and SZn are connected to the ground.

First ends of the X-, Y-, and Z-phase coils 14X, 14Y, and 14Z are connected to connection points between the sources of the X-, Y-, and Z-phase high-side switches SXp, SVp, and SZp and the drains of the X-, Y-, and Z-phase low-side switches SXn, SVn, and SZn. Second ends of the X-, Y-, and Z-phase coils 14X, 14Y, and 14Z are connected by a second neutral point N2.

The rotating electric machine apparatus includes a first half-bridge circuit 60 that includes a series-connection body that includes a first high-side neutral point switch S1Mp and a first low-side neutral point switch S1Mn. According to the present embodiment, an N-channel MOSFET is used as each of the neutral point switches S1Mp and S1Mn. The positive terminal of the direct-current power supply 50 is connected to the drain of the first high-side neutral point switch S1Mp. The source of the first low-side neutral point switch S1Mn is connected to the ground. The first neutral point N1 is connected to a connection point between the source of the first high-side neutral point switch S1Mp and the drain of the first low-side neutral point switch S1Mn.

The rotating electric machine apparatus includes a second half-bridge circuit 70 has a series-connection body that includes a second high-side neutral point switch S2Mp and a second low-side neutral point switch S2Mn. According to the present embodiment, an N-channel MOSFET is used as each of the neutral point switches S2Mp and S2Mn. The positive terminal of the direct-current power supply 50 is connected to the drain of the second high-side neutral point switch S2Mp. The source of the second low-side neutral point switch S2Mn is connected to the ground. The second neutral point N2 is connected to a connection point between the source of the second high-side neutral point switch S2Mp and the drain of the second low-side neutral point switch S2Mn.

The rotating electric machine apparatus includes a control apparatus 80. The control apparatus 80 performs switching control of each of the switches configuring the first inverter 30, the second inverter 40, the first half-bridge circuit 60, and the second half-bridge circuit 70 based on magnetic-pole position information Sig of the rotor 11.

Here, for example, as the magnetic-pole position information Sig, electrical angle information detected by an angle detector that detects an electrical angle of the rotor 11 can be used. In this case, for example, a resolver, a Hall integrated circuit (IC), a magnetoresistive (MR) sensor, or an optical sensor can be used as the angle detector. In addition, for example, electrical angle information acquired through position-sensor-less control in which detection information from an angle detector is not used can also be used as the magnetic-pole position information Sig.

Here, for example, the rotating electric machine apparatus may be such that the rotating electric machine 10, the inverters 30 and 40, the half-bridge circuits 60 and 70, and the control apparatus 80 are configured in an integrated manner. Alternatively, each of these apparatuses may be configured such as to be separately arranged.

Next, processes of the control apparatus 80 will be described. According to the present embodiment, the control apparatus 80 corresponds to a half-wave driving unit, a full-wave driving unit, and an executing unit.

Figure 3:
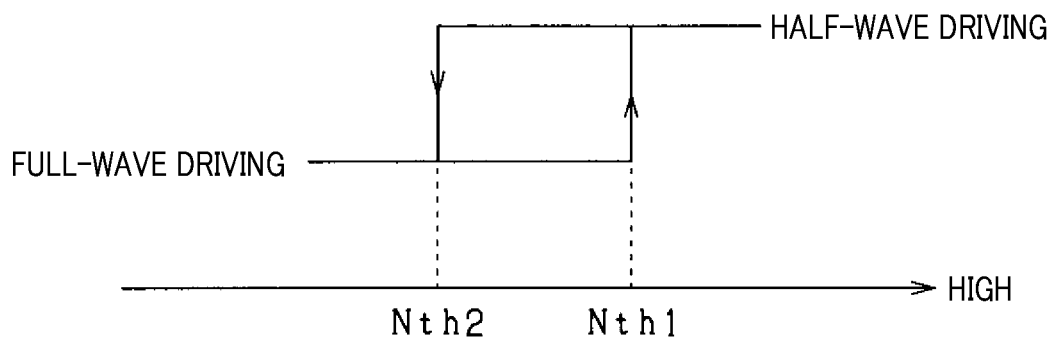
FIG. 3 is a diagram of an aspect of switching between a full-wave driving process and a half-wave driving process.

The control apparatus 80 drives the rotating electric machine 10 as an electric motor by controlling the inverters 30 and 40 based on the magnetic-pole position information Sig. Specifically, the control apparatus 80 calculates a rotation speed Nm of the rotor 11 based on the magnetic-pole position information Sig. As shown in FIG. 3, when determined that the calculated rotation speed Nm is equal to or less than a first predetermined value Nth1, the control apparatus 80 performs the full-wave driving process. This process is a process in which switching control of the switches configuring the first inverter 30 and the switches configuring the second inverter 40 is performed in a state in which the neutral point switches S1Mp, S1Mn, S2Mp, and S2Mn are turned off. Here, as a result of the switching control of the switches configuring the inverters 30 and 40, symmetrical three-phase alternating currents flow to the coils 13 and 14 from the inverters 30 and 40. For example, as a method for sending the symmetrical three-phase alternating current, a known method such as vector control may be used.

Figure 4:
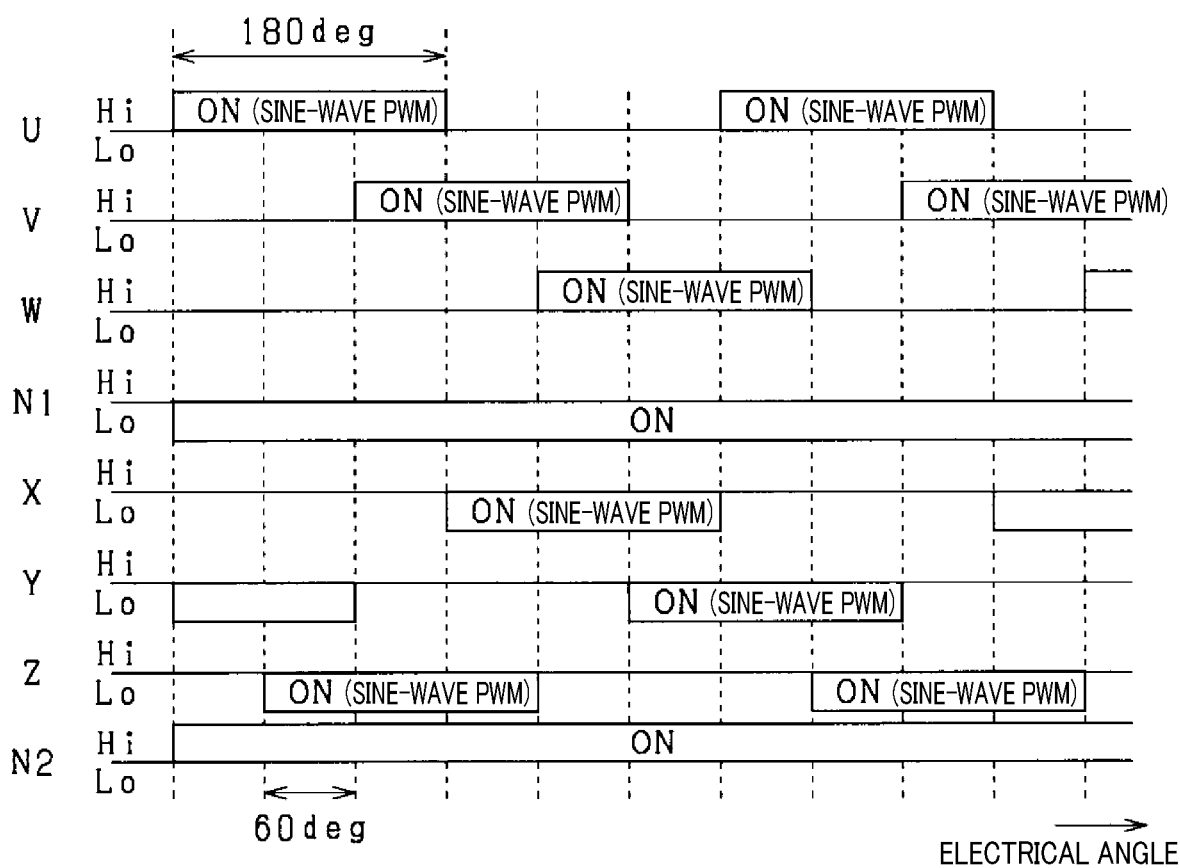
FIG. 4 is a diagram of an aspect of driving switches configuring first and first second inverters and neutral point switches.

Meanwhile, as shown in FIG. 3, when determined that the rotation speed Nm of the rotor 11 exceeds the first predetermined value Nth1, the control apparatus 80 performs the half-wave driving process. This process is a process in which the first low-side neutral point switch S1Mn and the second high-side neutral point switch S2Mp are turned on, and the first high-side neutral point switch S1Mp, the second low-side neutral point switch S2Mn, the U-, V-, W-phase low-side switches SUn, SVn, and SWn, and the X-, Y-, Z-phase high-side switches SXp, SYp, and SZp are turned off. In addition, the half-wave driving process includes a process in which switching control of the U-, V-, W-phase high-side switches SUp, SVp, and SWp and the X-, Y-, Z-phase low-side switches SXn, SYn, and SZn is performed in an energization pattern shown in FIG. 4. In FIG. 4, a single scale mark indicates 60 electrical degrees.

Specifically, the control apparatus 80 shifts start timings for energization control of the U-, V-, W-phase high-side switches SUp, SVp, and SWp by 120 degrees for each of the U-, V-, W-phases. In addition, the control apparatus 80 performs energization control of the U-, V-, W-phase high-side switches SUp, SVp, and SWp at every single electrical angle period over an electrical angle half period (180 degrees) for each of the U-, V-, and W-phases. Therefore, a non-energization period of 180 electrical degrees is present for the U-, V-, W-phase high-side switches SUp, SVp, and SWp.

Meanwhile, the control apparatus 80 shifts start timings for energization control of the X-, Y-, Z-phase low-side switches SXn, SYn, and SZn by 120 degrees for each of the X-, Y-, Z-phases. In addition, the control apparatus 80 performs energization control of the X-, Y-, Z-phase low-side switches SXn, SYn, and SZn at every single electrical angle period over an electrical angle half period (180 degrees) for each of the X-, Y-, Z-phases. Therefore, a non-energization period of 180 electrical degrees is present regarding the X-, Y-, Z-phase low-side switches SXn, SYn, and SZn.

Here, spatial phases of the U phase and the X phase coincide. The control unit 80 shifts the start timing for energization control of the U-phase high-side switch SUp and the start timing for energization control of the X-phase low-side switch SXn by 180 electrical degrees.

In addition, the spatial phases of the V phase and the Y phase coincide. The control unit 80 shifts the start timing for energization control of the V-phase high-side switch SVp and the start timing for energization control of the Y-phase low-side switch SYn by 180 electrical degrees.

Furthermore, the spatial phases of the W phase and the Z phase coincide. The control unit 80 shifts the start timing for energization control of the W-phase high-side switch SWp and the start timing for energization control of the Z-phase low-side switch SZn by 180 electrical degrees.

Figure 5:
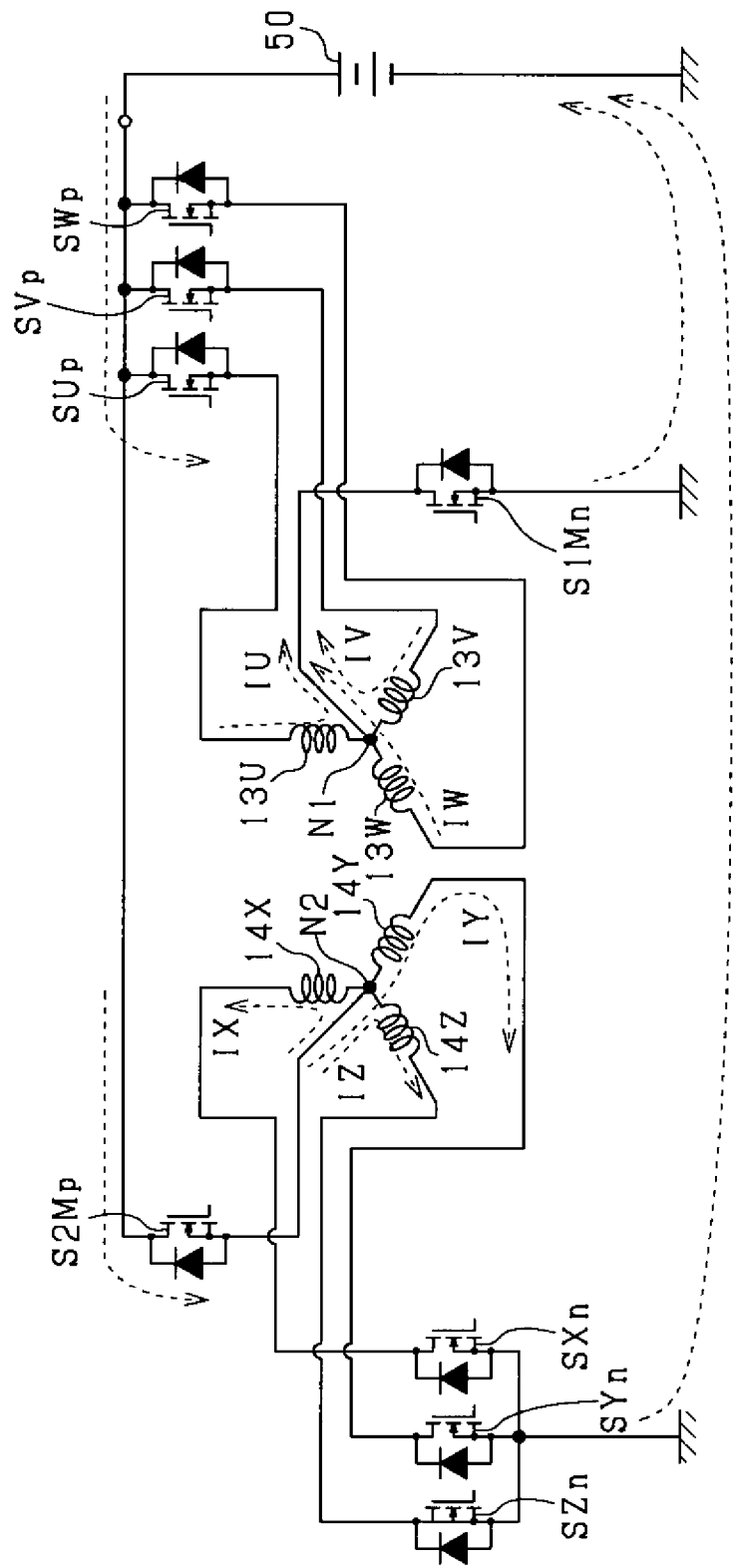
FIG. 5 is a diagram of a current flow path during the half-wave driving process.

FIG. 5 shows a circuit flow path when the switches of the first and second inverters 30 and 40 are driven in the energization pattern shown in FIG. 4. In FIG. 5, illustration of switches that are turned OFF at all times during the half-wave driving process is omitted.

First, regarding the first coil 13, as indicated by broken-line arrows, the current flows over a loop path that includes the positive terminal of the direct-current power supply 50, the high-side switches configuring the first inverter 30 that are in an on-state, the first neutral point N1, the first low-side neutral point switch S1Mn, the ground, and the negative terminal of the direct-current power supply 50. That is, the current is sent from each high-side switch to each phase coil and then circulated from the first low-side neutral point switch S1Mn to the direct-current power supply 50 via the ground. The currents flowing to the U-, V-, and W-phase coils 13U, 13V, and 13W are denoted by IU, IV, and IW.

Next, regarding the second coil 14, as indicated by broken-line arrows, the current flows over a loop path that includes the positive terminal of the direct-current power supply 50, the second high-side neutral point switch S2Mp, the second neutral point N2, the low-side switches configuring the second inverter 40 that are in an on-state, the ground, and the negative terminal of the direct-current power supply 50. That is, the current is sent from the second high-side neutral point switch S2Mp to each phase coil and then circulated from each low-side switch to the direct-current power supply 50 via the ground. The currents flowing to the X-, Y-, Z-phase coils 13X, 13Y, and 13Z are denoted by IX, IY, and IZ.

Figure 6:
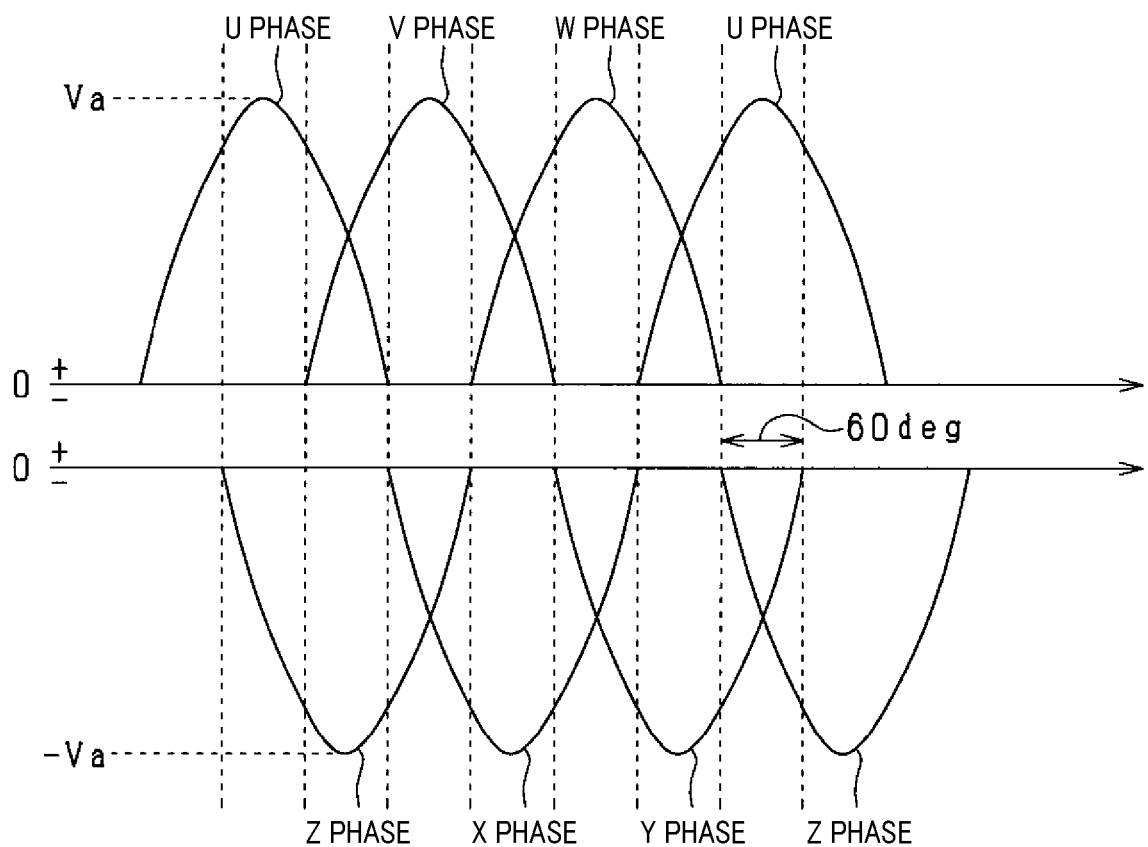
FIG. 6 is a diagram of a sine-wave current that flows to each phase.
Figure 7:
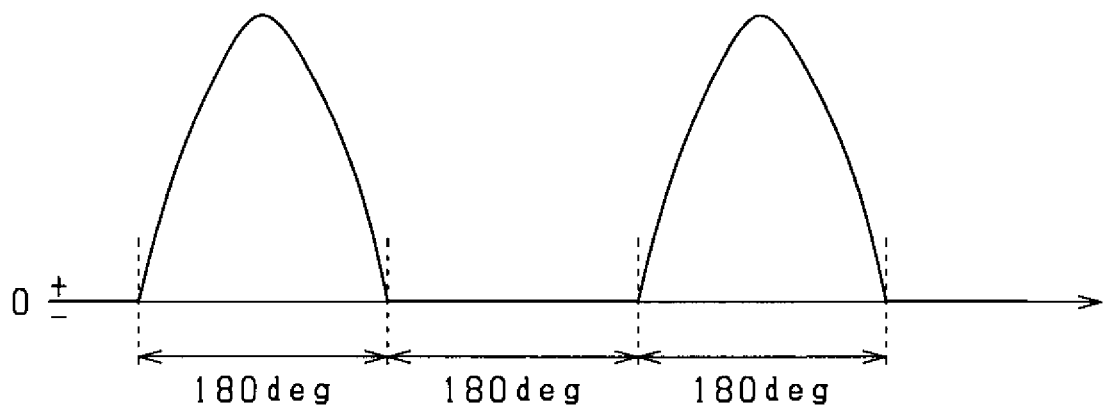
FIG. 7 is a diagram of a sine-wave current that flows to a certain phase.

Here, according to the present embodiment, as shown in FIG. 4, the energization control of the switches SUp, SVp, SWp, SXn, SYn, and SZn is performed by sine-wave pulse width modulation (PWM) control. In this case, as shown in FIG. 6, a waveform of the current flowing to each phase coil is a waveform corresponding to a half wave of a sine wave. Specifically, when focus is placed on the U-phase coil 13U, as shown in FIG. 7, the sine-wave current flows only during a period of 180 electrical degrees. The current does not flow during the period of the remaining 180 degrees. In addition, as shown in FIG. 6, in both the first coil 13 and the second coil 14, a period during which energization is performed in an overlapping manner over 60 electrical degrees is present. In FIG. 6, a direction from the second end of each phase coil to the neutral point is defined as being positive. A direction from the neutral point to the second end of each phase coil is defined as being negative.

In FIG. 6, a peak value of the current flowing to each of the phase coils 13U to 13W and 14X to 14Z is denoted by Va. In addition, according to the present embodiment, the peak value of the current flowing to each of the phase coils 13U to 13W and 14X to 14Z is set to be equal between when the full-wave driving process is performed and when the half-wave driving process is performed.

Next, effects of the half-wave driving process according to the present embodiment will be described with reference to FIG. 8 and FIG. 9. Here, conventional technology indicated in FIG. 8 and FIG. 9 refers to a technology in which, in the configuration shown in FIG. 1, described above, each of the switches configuring the second inverter 40 is controlled in the same manner as each of the switches configuring the first inverter 30, and the second high-side neutral point switch S2Mp and the second low-side neutral point switch S2Mn are controlled in the same manner as the first high-side neutral point switch S1Mp and the second low-side neutral point switch S1Mn.

Figure 8:
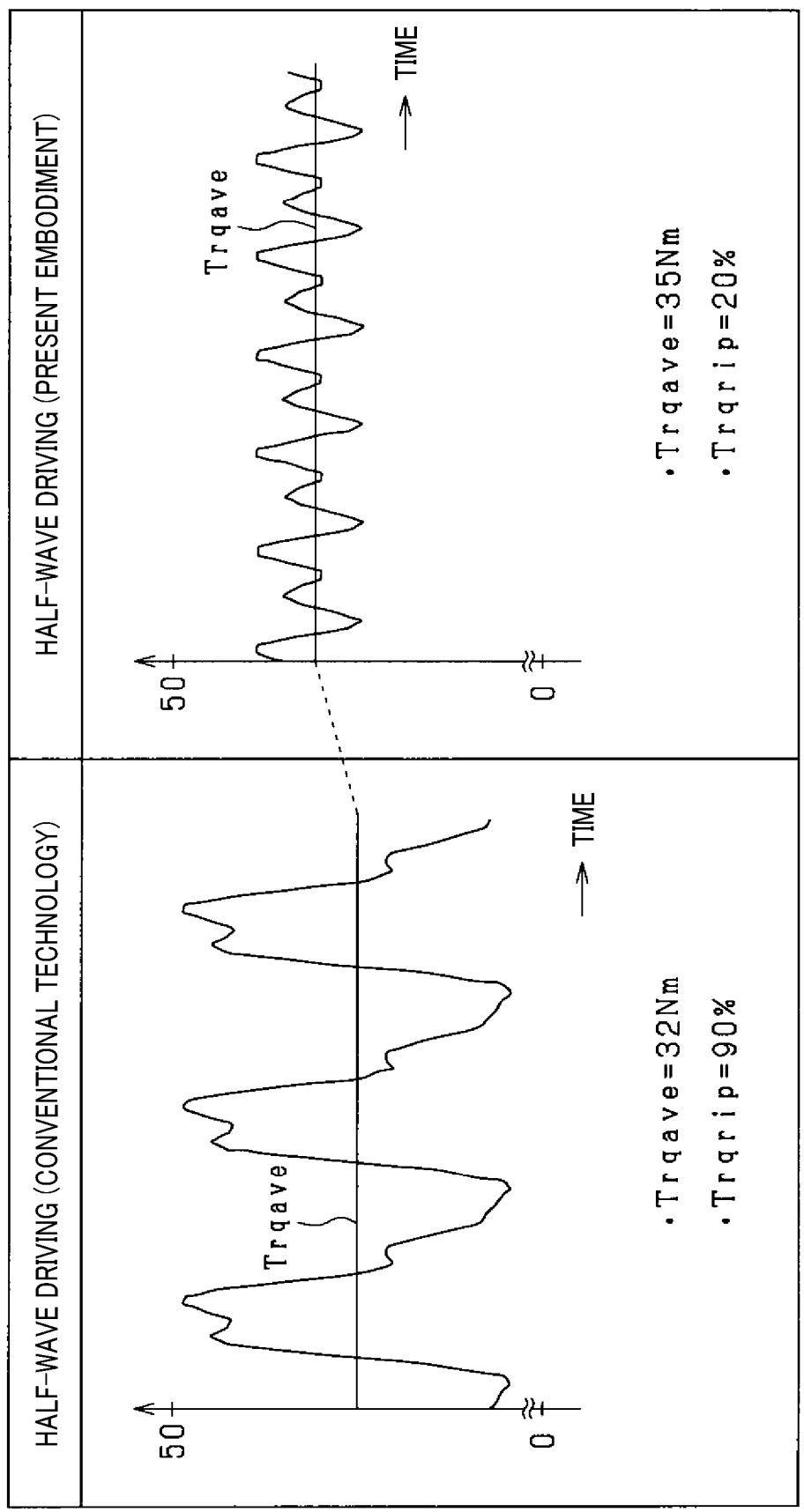
FIG. 8 is a diagram of an effect of reducing torque ripple and an effect of increasing average torque during the half-wave driving process.
Figure 9:
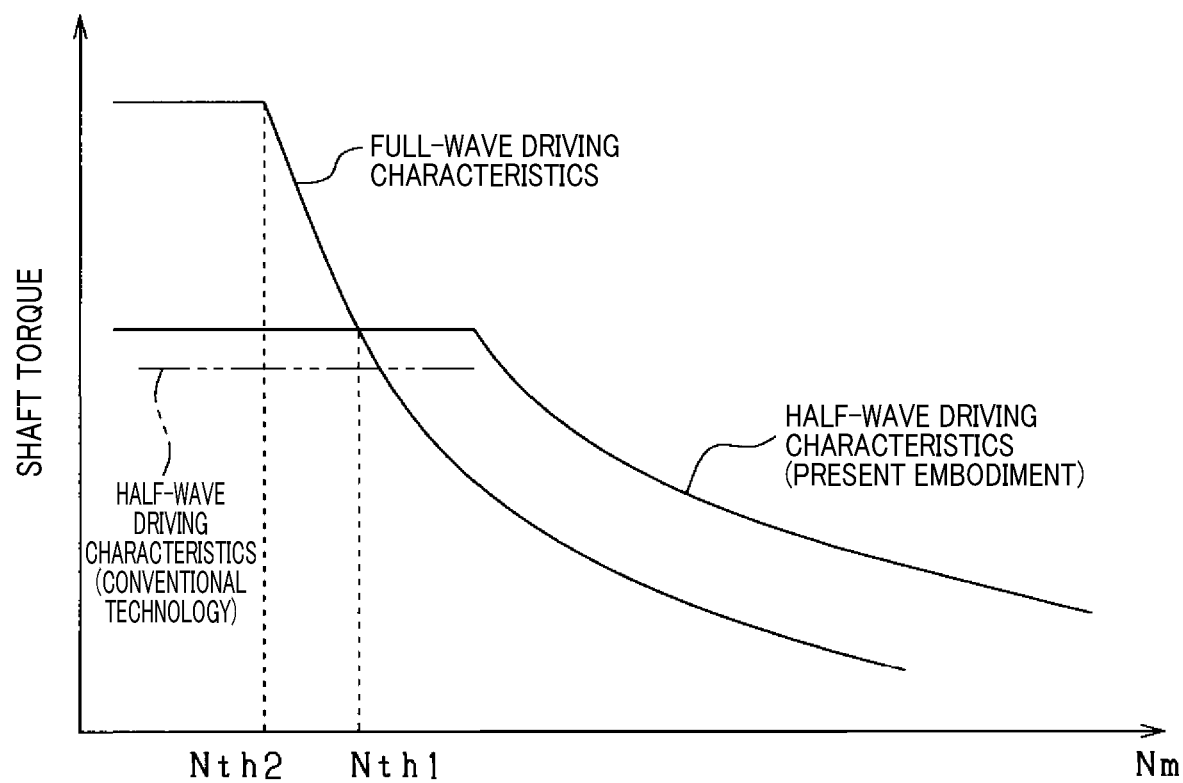
FIG. 9 is a characteristics diagram of a torque increasing effect during the half-wave driving process.

As shown in FIG. 8, as a result of the half-wave driving process according to the present embodiment, compared to the conventional technology, torque ripple Trqrip of the rotating electric machine 10 can be reduced. According to the present embodiment, the torque ripple Trqrip can be reduced from 90% to 20%. The torque ripple Trqrip being 90% means that the percentage of torque pulsation in relation to average torque Trqave of the rotating electric machine 10 is 90%.

The torque ripple Trqrip can be reduced because a current flow direction of the U-, V-, and W-phase coils 13U, 13V, and 13W with reference to the first neutral point N1 and a current flow direction of the X-, Y-, and Z-phase coils 14X, 14Y, and 14Z with reference to the second neutral point N2 become opposite, and a maximum instantaneous torque of the rotating electric machine 10 can be reduced and a minimum instantaneous torque can be increased.

In particular, according to the present embodiment, as a result of configurations (A) to (C) below being achieved, for example, regarding the U, V, W, and Z phases, at a timing in the middle of a period from the start timing of the energization control of the U-phase coil 13U to the end timing of the energization control of the V-phase coil 13V, the current flowing to the Z-phase coil 14Z of which the spatial phase coincides with that of the W phase can be maximized. As a result, the effect of reducing the torque ripple can be increased.

(A) The start timings for the energization control of the U-, V-, and W-phase high-side switches SUp, SVp, and SWp are each shifted by 120 degrees (=360 degrees/3). The start timings for the energization control of the X-, Y-, and Z-phase low-side switches SXn, SYn, and SZn are each shifted by 120 degrees.

(B) The start timing for the energization control of the U-phase high-side switch SUp and the start timing for the energization control of the X-phase low-side switch SXn of which the spatial phase coincides with that of the U phase are shifted by 180 degrees. The start timing for the energization control of the V-phase high-side switch SVp and the start timing for the energization control of the Y-phase low-side switch SYn of which the spatial phase coincides with that of the V phase are shifted by 180 degrees. The start timing for the energization control of the W-phase high-side switch SWp and the start timing for the energization control of the Z-phase low-side switch SZn of which the spatial phase coincides with that of the W phase are shifted by 180 degrees (C) An energization control period of each of the phase coils 13U to 13W and 14X to 14Z is set to 180 degrees.

In addition, as a result of the half-wave driving process according to the present embodiment, compared to the conventional technology, the average torque Trqave of the rotating electric machine 10 can be increased while the maximum instantaneous torque of the rotating electric machine 10 decreases. The average torque Trqave is substantially equal to an average value of the maximum torque and the minimum torque. According to the present embodiment, the average torque Trqave can be increased from 32 Nm to 35 Nm.

The average torque Trqave can be increased for the reason described below. For example, regarding the U and X phases, during the period over which the U-phase coil 13U is not energized, a current in a direction opposite the direction of the current that flows to the U-phase coil 13U flows to the X-phase coil 14X of which the spatial phase coincides with that of the U-phase coil. As a result, the minimum value of the torque of the rotating electric machine 10 that periodically varies can be raised. The average torque Trqave can be increased. In addition, as a result of the increase in the average torque Trqave, as indicated by the rotation speed Nm and the torque characteristics in FIG. 9, the torque in a high-rotation-speed range equal to or greater than the predetermined value Nth1 can be made higher than that in the conventional technology.

According to the present embodiment, as shown in FIG. 3, when the rotation speed Nm of the rotor 11 is determined to have fallen below a second predetermined value Nth2 that is less than the first predetermined value Nth1 after the rotation speed Nm is determined to have temporarily exceeded the first predetermined value Nth1, the control apparatus 80 switches from the half-wave driving process to the full-wave driving process. As a result, occurrence of frequent switching from one to the other between the half-wave driving process and the full-wave driving process can be prevented.

According to the present embodiment, as shown in FIG. 5, the rated currents of the first high-side neutral point switch S1Mp and the first low-side neutral point switch S1Mn are set to be greater than the rated currents of the switches SUp to SWn configuring the first inverter 30. Specifically, the rated currents of the first high-side neutral point switch S1Mp and the first low-side neutral point switch S1Mn are set to be 1.5 to 2 times the rated currents of the switches SUp to SWn. In addition, the rated currents of the second high-side neutral point switch S2Mp and the second low-side neutral point switch S2Mn are set to be greater than the rated currents of the switches SXp to SZn configuring the second inverter 40. As a result, reliability of each of the neutral point switches S1Mp and S2Mp when the half-wave driving process is performed can be increased.

Second Embodiment

Figure 10:
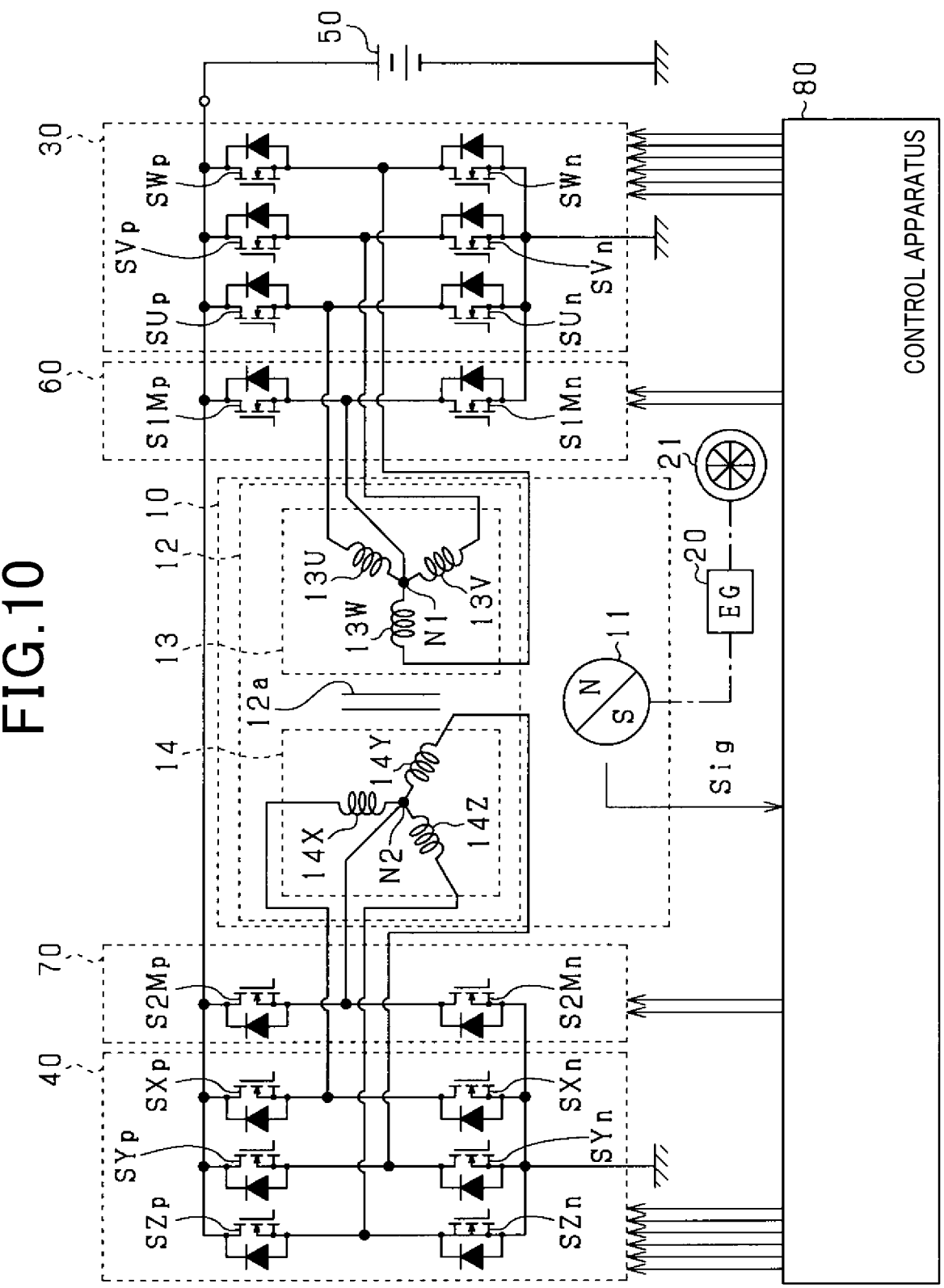
FIG. 10 is an overall configuration diagram of the onboard rotating electric machine apparatus according to a second embodiment.

A second embodiment will be described below with reference to the drawings, focusing of the differences from the above-described first embodiment. According to the present embodiment, as shown in FIG. 10, the first coil 13 and the second coil 14 are wound around the stator core 12a such that a spatial phase difference is present between the first coil 13 and the second coil 14. According to the present embodiment, the above-described spatial phase difference is set to 30 electrical degrees. In FIG. 10, configurations that are identical to the configurations shown in FIG. 1, described above, are given the same reference numbers for convenience.

Figure 11:
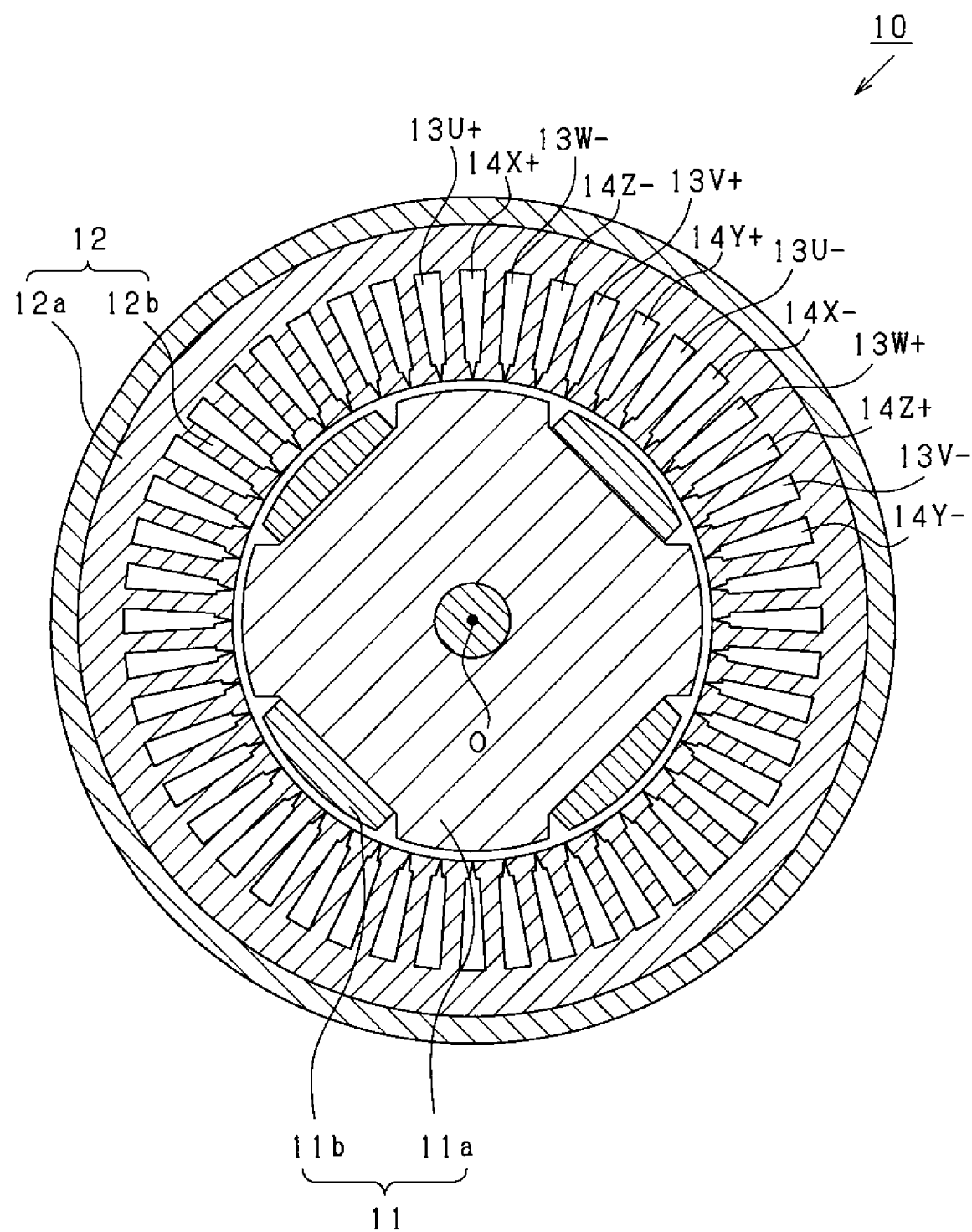
FIG. 11 is a cross-sectional view of the rotating electric machine.

A configuration of the rotating electric machine 10 according to the present embodiment will be described in detail with reference to FIG. 11. In FIG. 11, configurations that are identical to the configurations shown in FIG. 2, described above, are given the same reference numbers for convenience.

As shown in FIG. 11, a coil is housed in each of the slots that are arrayed in the circumferential direction of the stator core 12a, in order from the U-phase coil 13U+, the X-phase coil 14X+, the W-phase coil 13W−, the Z-phase coil 14Z−, the V-phase coil 13V+, the Y-phase coil 14Y+, the U-phase coil 13U−, the X-phase coil 14X−, the W-phase coil 13W+, the Z-phase coil 14Z+, the V-phase coil 13V−, to the Y-phase coil 14Y−. In FIG. 11, six slots that are arrayed in the circumferential direction form 180 electrical degrees. Therefore, slots that are adjacent to each other are separated by 30 electrical degrees (=180 degrees/6).

Figure 12:
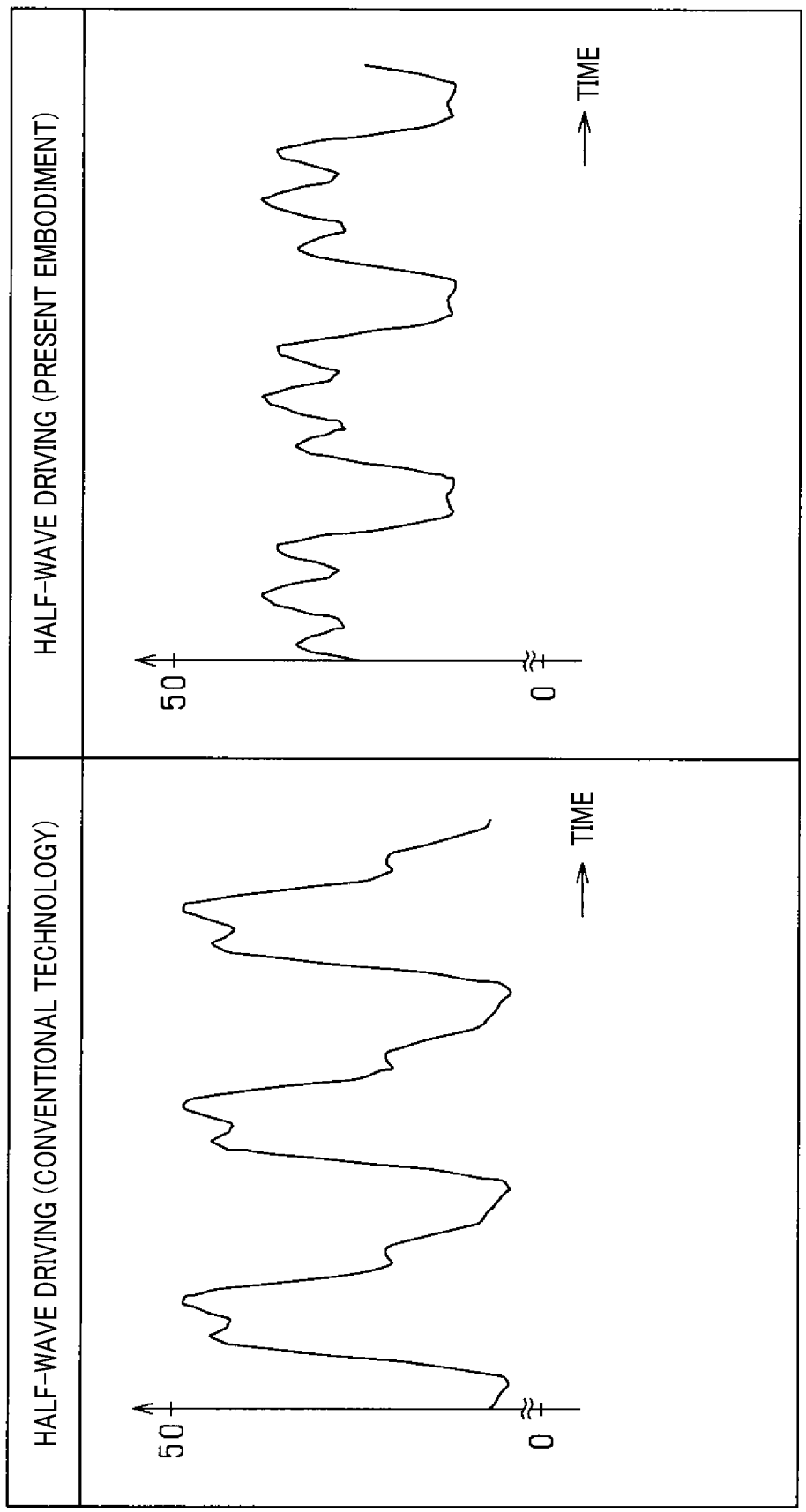
FIG. 12 is a diagram of the effect of reducing torque ripple during the half-wave driving process.

FIG. 12 shows the effect of reducing the torque ripple according to the present embodiment. As shown in FIG. 12, according to the present embodiment, the effect of reducing the torque ripple corresponding to the effect shown in FIG. 8 according to the above-described first embodiment can be achieved.

Third Embodiment

Figure 13:
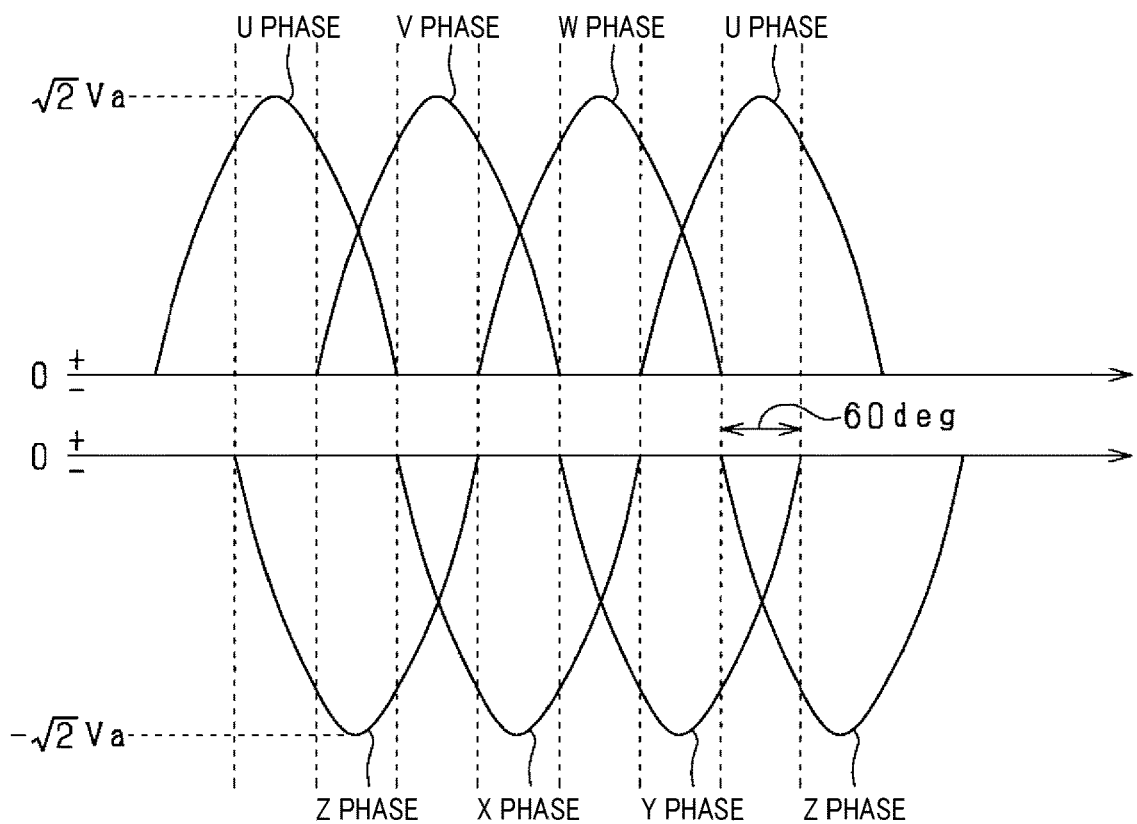
FIG. 13 is a diagram of the sine-wave current that flows to each phase according to a third embodiment

A third embodiment will be described below with reference to the drawings, focusing of the differences from the above-described first embodiment. According to the present embodiment, as shown in FIG. 13, the peak value of the current flowing to each of the phase coils 13U to 13W and 14X to 14Z configuring the first and second coils 13 and 14 is greater when the half-wave driving process is performed, compared to when the full-wave driving process is performed.

The energization periods of the first and second coils 13 and 14 when the half-wave driving process is performed are substantially half of those of the first and second coils 13 and 14 when the full-wave driving process is performed. Therefore, a heat generation amount of each of the coils 13 and 14 through which a current flows when the half-wave driving process is performed is substantially half of the heat generation amount of each of the coils 13 and 14 through which a current flows when the full-wave driving process is performed. Here, thermal design of each constituent component of the rotating electric machine apparatus is made such that reliability does not decrease when the full-wave driving process of which the energization periods are long is performed. Therefore, the heat generation amount of each of the coils 13 and 14 when the half-wave driving process is performed has leeway in relation to an allowable upper-limit value at which decrease in reliability does not occur. Thus, even when the heat generation amount of each of the coils 13 and 14 when the half-wave driving process is performed is increased to about the heat generation amount when the full-wave driving process is performed, reliability of each constituent component of the rotating electric machine apparatus does not decrease.

Therefore, according to the present embodiment, the peak value of the current sent to each of the phase coils 13U to 13W and 14X to 14Z is set to be greater when the half-wave driving process is performed, compared to when the full-wave driving process is performed. Specifically, the peak value of the current when the half-wave driving process is performed can be increased within a range at which √2-times the peak value of the current when the full-wave driving process is performed is not exceeded. Here, √2-times is derived based on the range at which the heat generation amount does not exceed a two-fold amount corresponding to a range at which the √2-fold value is not exceeded in terms of the current value, because the heat generation amount is proportional to the square of the current.

Figure 14:
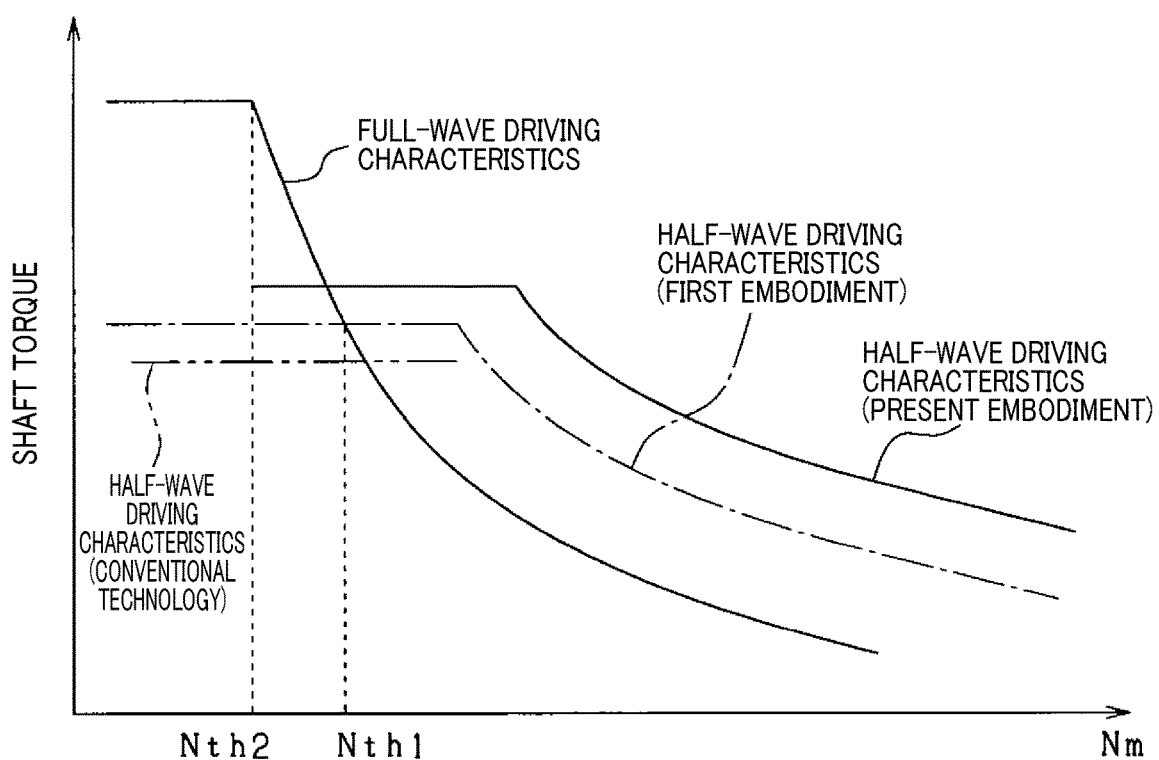
FIG. 14 is a characteristics diagram of the torque increasing effect during the half-wave driving process.

According to the present embodiment described above, as indicated by a solid line in FIG. 14, the torque in the high-speed range of the rotating electric machine 10 during the half-wave driving process can be made greater than the torque according to the above-described first embodiment, indicated by a single-dot chain line in FIG. 14.

Fourth Embodiment

A fourth embodiment will be described below with reference to the drawings, focusing of the differences from the above-described first embodiment. According to the present embodiment, a mode switching process is performed during the half-wave driving process.

Figure 15:
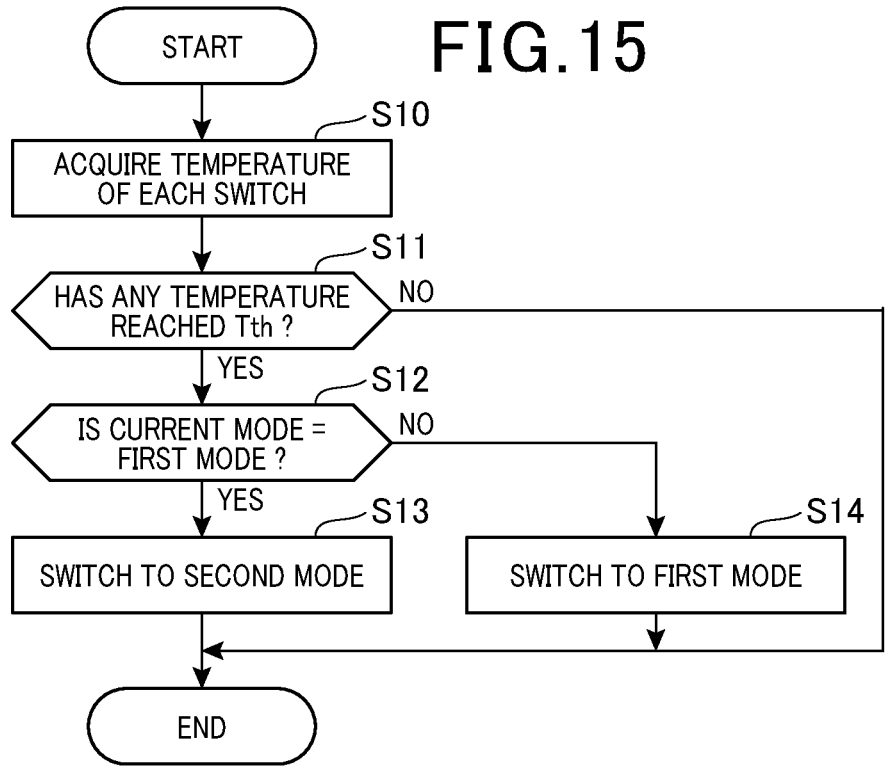
FIG. 15 is a flowchart of the steps in a mode switching process according to a fourth embodiment.

FIG. 15 shows the steps in the mode switching process. For example, the control apparatus 80 repeatedly performs this process at every predetermined period under a condition that the half-wave driving process is being performed.

In this series of processes, first, at step S10, respective temperatures of the switches SUp to SWn and SXp to SZn configuring the inverters 30 and 40, and the switches S1Mp, S1Mn, S2Mp, and S2Mn configuring the half-bridge circuits 60 and 70 are individually acquired. Here, for example, each temperature may be a detection value from a temperature detecting unit that detects the temperature of each switch.

At subsequent S11, whether or not any of the temperatures, among the temperatures acquired at step S10, has reached a threshold temperature Tth is determined. Here, for example, the threshold temperature Tth may be set to a junction temperature of each switch.

When an affirmative determination is made at step S11, the control apparatus 80 proceeds to step S12 and determines whether or not a current mode is a first mode. The first mode refers to a mode in which each switch is controlled in the energization pattern shown in FIG. 4, described above.

Figure 16:
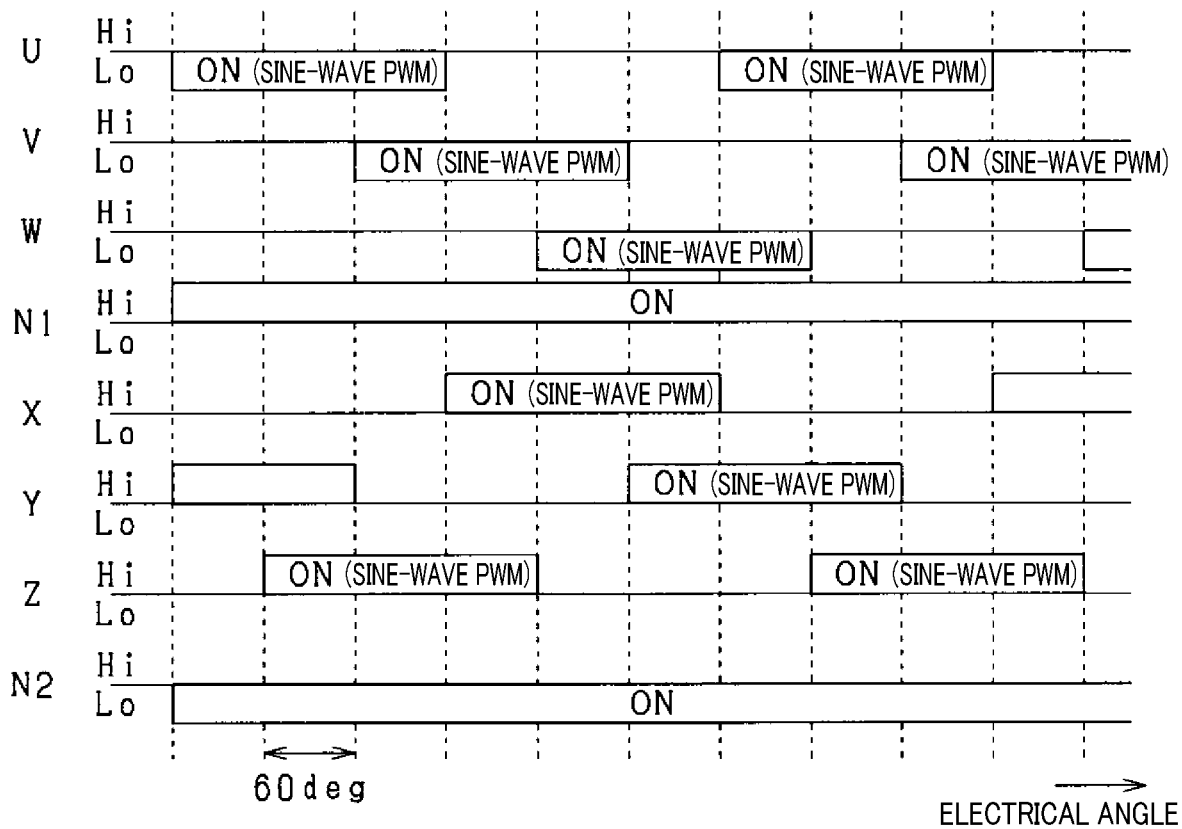
FIG. 16 is a diagram of an aspect of driving the switches configuring the first and first second inverters and the neutral point switches.

When determined that the current mode is the first mode at step S12, the control apparatus 80 proceeds to step S13 and switches to a second mode. The second mode refers to a mode in which each switch is controlled in an energization pattern shown in FIG. 16. In the second mode, the switches to be energization control subjects among the switches SUp to SWn configuring the first inverter 30 are changed from the high-side switches SUp to SWp to the low-side switches SUn to SWn. In addition, the energization control subject is changed from the first low-side neutral point switch S1Mn to the first high-side neutral point switch S1Mp. The energization control period of each of the low-side switches SUn, SVn, and SWn in the second mode is shifted by 180 degrees from the energization control period of each of the high-side switches SUp, SVp, and SWp in the first mode. That is, the energization control period of each of the low-side switches SUn, SVn, and SWn in the second mode shown in FIG. 16 is a period over which the high-side switches SUp, SVp, and SWp are not energization-controlled in the first mode shown in FIG. 4, described above.

Furthermore, in the second mode, the switches to be energization control subjects among the switches SXp to SZn configuring the second inverter 40 are changed from the low-side switches SXn to SZn to the high-side switches SXp to SZp. In addition, the energization control subject is changed from the second high-side neutral point switch S2Mp to the second low-side neutral point switch S2Mn. The energization control period of each of the high-side switches SXp, SYp, and SZp in the second mode is shifted by 180 degrees from the energization control period of each of the low-side switches SXn, SYn, and SZn in the first mode. That is, the energization control period of each of the high-side switches SXp, SYp, and SZp in the second mode shown in FIG. 16 is a period over which the low-side switches SXn, SYn, and SZn are not energization-controlled in the first mode shown in FIG. 4, described above.

Figure 17:
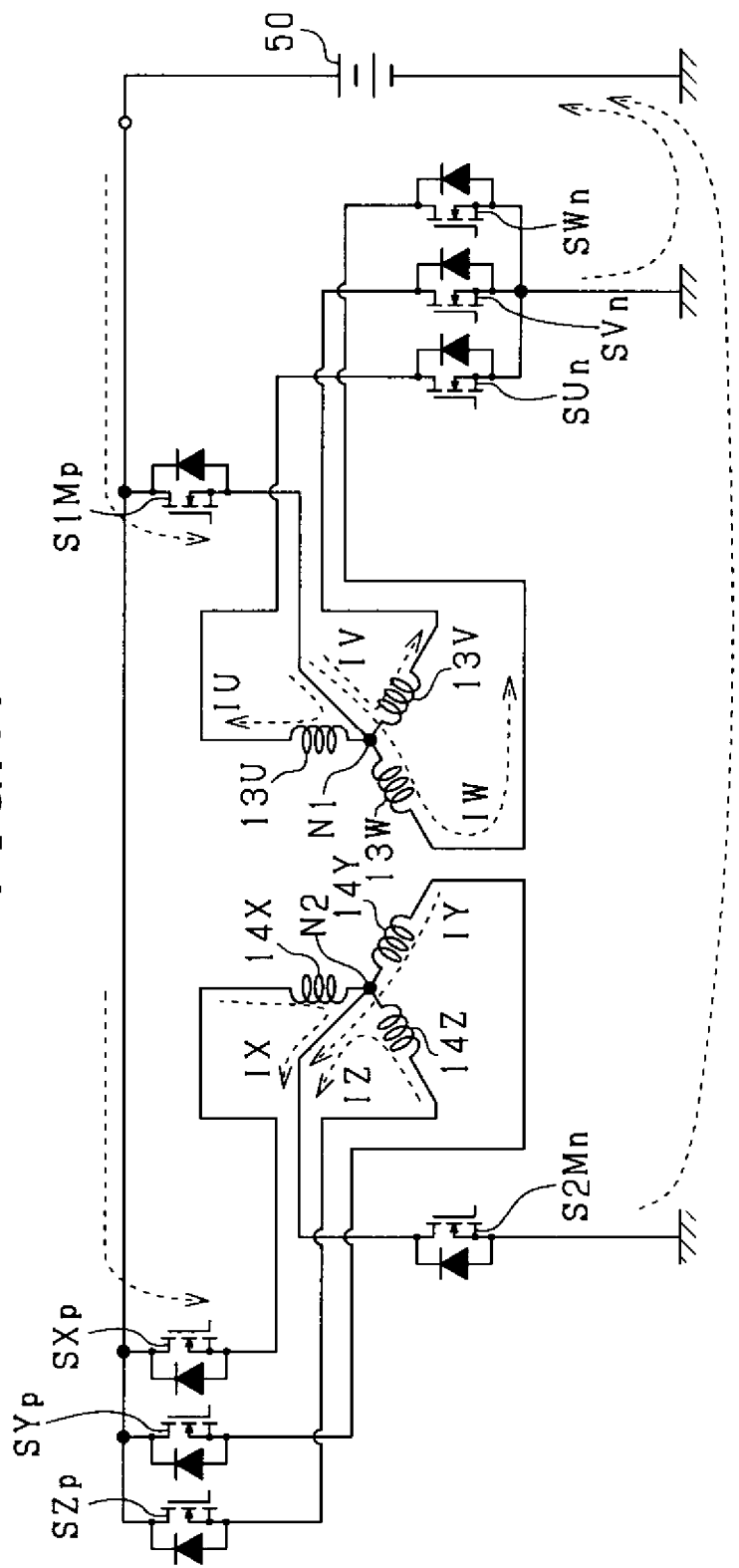
FIG. 17 is a diagram of the current flow path during the half-wave driving process.

Here, FIG. 17 shows a current flow path when the second mode is performed. In FIG. 17, illustration of the switches that are turned off at all times while the second mode is performed is omitted.

Returning to the description of FIG. 15, above, when determined that the current mode is the second mode at step S12, the control apparatus 80 proceeds to step S14 and switches to the first mode.

The mode switching process described above is performed to prevent decrease in the reliability of the rotating electric machine apparatus. That is, when only the first mode continues to be performed during the half-wave driving process, load is concentrated on the high-side switches SUp to SWp configuring the first inverter 30 and the first low-side neutral point switch S1Mn. Fatigue in joining portions between each switch and a substrate, such as soldering portions, is a concern. In this case, heat-release characteristics of each switch deteriorates, the temperature of each switch tends to increase, and each switch entering an overheated state becomes a concern.

Therefore, according to the present embodiment, the mode switching process is performed. As a result of this process, the first mode and the second mode are alternately performed with the temperature of any of the switches SUp to SWn and SXp to SZn configuring the inverters 30 and 40 and the switches S1Mp, S1Mn, S2Mp, and S2Mn reaching the threshold temperature Tth serving as a trigger. As a result, when the half-wave driving process is performed, the current continuously flowing to certain switches, among the switches configuring the inverters 30 and 40 and the switches configuring the half-bridge circuits 60 and 70, can be prevented. Consequently, fatigue in the joining portions of certain switches can be prevented, and decrease in the reliability of the rotating electric machine apparatus can be prevented.

Other Embodiments

The above-described embodiments may be modified in the following manner.

According to the above-described first embodiment, energization control of each of the switches SUp, SVp, SWp, SXn, SYn, and SZn is performed by sine-wave PWM control but is not limited thereto. For example, control in which each of the switches SUp, SVp, SWp, SXn, SYn, and SZn is continuously turned on over the electrical angle half period that is the energization control period of each of the switches SUp, SVp, SWp, SXn, SYn, and SZn may be performed. In addition, for example, each of the switches SUp, SVp, SWp, SXn, SYn, and SZn may be on/off controlled at a predetermined time ratio during the energization control period. The time ratio herein refers to a ratio "Ton/Tsw" of an on-time Ton of the switch to a prescribed amount of time Tsw.

According to the above-described fourth embodiment, switching from one mode to the other mode, of the first mode and the second mode, is performed with the temperature of any of the switches SUp to SWn and SXp to SZn configuring the inverters 30 and 40 and the switches S1Mp, S1Mn, S2Mp, and S2Mn configuring the half-bridge circuits 60 and 70 reaching the threshold temperature Tth serving as the trigger, but is not limited thereto. For example, switching from one mode to the other mode, of the first mode and the second mode, may be performed every fixed amount of time without the temperatures of the switches being acquired.

When the mode switching process according to the above-described fourth embodiment is not performed, the first high-side neutral point switch S1Mp and the second low-side neutral point switch S2Mn may be eliminated from the rotating electric machine apparatus.

According to the above-described first embodiment, the energization control period of the U-, V-, and W-phase high-side switches SUp, SVp, and SWp, and the X-, Y-, and Z-phase low-side switches SXn, SYn, and SZn is the electrical angle half period (180 degrees), but is not limited thereto. For example, the energization control period maybe a period from 120 degrees or greater to less than 180 degrees, and preferably, a period from 150 degrees or greater to less than 180 degrees. When the energization control period is 120 degrees, the coils of at least two phases among the three phases are simultaneously not energized in the inverters 30 and 40.

According to the above-described embodiment, a first predetermined period that is the energization control period of the U-, V-, and W-phase high-side switches SUp, SVp, and SWp and a second predetermined period that is the energization control period of the X-, Y-, and Z-phase low-side switches SXn, SYn, and SZn are equal, but are not limited thereto. For example, the first predetermined period and the second predetermined period may be set to differing periods under a condition that the effect of reducing torque ripple in relation to that of the conventional technology does not excessively decrease.

According to the above-described first embodiment, the inverters 30 and 40 are three-phase inverters, but are not limited thereto. The inverters 30 and 40 may be two-phase, or four-phase or more. In this case, when an integer of two or four or more is defined as M, the half-wave driving process may be a process described below.

The control apparatus 80 performs energization control of the high-side switches configuring the first inverter 30 while shifting the start timings for energization control of the high-side switches by "360 degrees/M" for each of the M phases. In addition, the control apparatus 80 performs energization control of the low-side switches configuring the second inverter 40 while shifting the start timings for energization control of the high-side switches by "360 degrees/M" for each of the M phases. Here, the energization control period of each switch is set to a period that is "90 degrees+180 degrees/M" or greater and the electrical angle half period or less.

Each of the switches configuring the inverters and the neutral point switches is not limited to the N-channel MOSFET and, for example, may be an insulated-gate bipolar transistor (IGBT). For example, the IGBT may be made of Si. In the case of the IGBT, the high-potential-side terminal of the switch is a collector, and the low-potential-side terminal is an emitter.

For example, a material of each of the switches may be Si, SiC, or GaN.

The rotating electric machine is not limited to the permanent magnet field-type rotating electric machine. For example, the rotating electric machine may be a wound-field-type rotating electric machine, or a rotating electric machine that includes both the permanent magnet field and the wound field.

The direct-current power supply 50 is not limited to a low-voltage storage battery of which the rated voltage is 12 V. For example, the direct-current power supply 50 may be a high-voltage storage battery for use in hybrid cars and electric cars.

The rotating electric machine 10 is not limited to being connected to the output shaft of the engine 20 via a belt. For example, the configuration may be such that the rotating electric machine 10 is directly connected further towards the drive wheel 21 side than the gearbox on the power transmission path connecting the output shaft and the drive wheel 21.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A rotating electric machine apparatus comprising:
   a rotating electric machine; and
   a full-bridge inverter that performs electric power transfer with the rotating electric machine,
   the rotating electric machine including
      a first coil of each of N phases that is wound around a stator core and is connected by a star connection, N being an integer of 2 or more, and
      a second coil of each of N phases that is wound around the stator core while being electrically insulated from the first coil and is connected by a star connection,
   the full-bridge inverter including
      a first inverter that includes series-connection bodies of each of N phases including first high-side switches and first low-side switches, in which a connection point between the first high-side switch and the first low-side switch is connected to, of both ends of the first coil, a side opposite a neutral point side of the first coil, and
      a second inverter that includes series-connection bodies of each of N phases including second high-side switches and second low-side switches, in which a connection point between the second high-side switch and the second low-side switch is connected to, of both ends of the second coil, a side opposite a neutral point side of the second coil,
   the rotating electric machine apparatus comprising:
      a first neutral point switch that connects the neutral point of the first coil with, of both ends of the first low-side switch, a side opposite the connection point with the first high-side switch;
      a second neutral point switch that connects the neutral point of the second coil with, of both ends of the second high-side switch, a side opposite the connection point with the second low-side switch;
      a full-wave driving unit that performs a full-wave driving process in which switching control of the first high-side switches, the first low-side switches, the second high-side switches, and the second low-side switches is performed in a state in which the first neutral point switch and the second neutral point switch are turned off;
a half-wave driving unit that performs a half-wave driving process in which switching control of the first high-side switches and the second low-side switches is performed in a state in which the first neutral point switch and the second neutral point switch are turned on, and the first low-side switches and the second high-side switches are turned off; and
an executing unit that selects and performs either of the full-wave driving process and the half-wave driving process.

2. The rotating electric machine apparatus according to claim 1, wherein:
the half-wave driving unit
performs energization control of the first high-side switches at every single electrical angle period over a first predetermined period that is equal to or less than an electrical angle half period for each of the N phases, while shifting start timings for energization control of the first high-side switches for each of the N phases, and
performs energization control of the second low-side switches at every single electrical angle period over a second predetermined period that is equal to or less than the electrical angle half period for each of the N phases, while shifting start timings for energization control of the second low-side switches for each of the N phases.

3. The rotating electric machine apparatus according to claim 2, wherein:
the half-wave driving unit
performs energization control of the first high-side switches while shifting the start timings for energization control of the first high-side switches by "360 degrees/N" for each of the N phases, and
performs energization control of the second low-side switches while shifting the start timings for energization control of the second low-side switches by "360 degrees/N" for each of the N phases.

4. The rotating electric machine apparatus according to claim 3, wherein:
the first predetermined period and the second predetermined period are each set to a period that is "90 degrees+180 degrees/N" or greater and the electrical angle half period or less.

5. The rotating electric machine apparatus according to claim 4, wherein:
the first coil and the second coil are wound around the stator core such that a spatial phase difference between the first coil and the second coil is 0 electrical degrees; and
the half-wave driving unit performs energization control of the first high-side switches and the second low-side switches while shifting the start timings for energization control of the first high-side switches and the start timings for energization control of the second low-side switches by the electrical angle half period for each of the phases of which the spatial phase coincides.

6. The rotating electric machine apparatus according to claim 5, wherein:
the stator core includes a plurality of teeth portions that are formed in a circumferential direction of the stator core such as to be separated at a predetermined interval;
the first coil and the second coil are wound around a same teeth portion for each of the N phases; and
the phases of which the spatial phase coincides refer to the phases of the first coil and the second coil wound around the same teeth portion among the N phases.

7. The rotating electric machine apparatus according to claim 6, wherein:
the half-wave driving unit
performs energization control of the first high-side switches such that at least two phases, of the N phases, of the first coil, are simultaneously energized, and
performs energization control of the second low-side switches such that at least two phases, of the N phases, of the second coil, are simultaneously energized.

8. The rotating electric machine apparatus according to claim 7, wherein
peak values of currents flowing to the first coil and the second coil are greater when the half-wave driving process is performed, compared to when the full-wave driving process is performed.

9. The rotating electric machine apparatus according to claim 8, wherein:
the first neutral point switch is a first low-side neutral point switch;
the second neutral point switch is a second high-side neutral point switch;
the rotating electric machine apparatus includes
a first high-side neutral point switch that connects, of both ends of the first high-side switch, a side opposite the connection point with the first low-side switch and the neutral point of the first coil, and
a second low-side neutral point switch that connects, of both ends of the second low-side switch, a side opposite the connection point with the second high-side switch and the neutral point of the second coil;
the half-wave driving unit performs a process for alternately performing a first mode and a second mode,
the first mode being a process in which switching control of the first high-side switches and the second low-side switches is performed in a state in which the first low-side neutral point switch and the second high-side neutral point switch are turned on, and the first high-side neutral point switch, the second low-side neutral point switch, the first low-side switches, and the second high-side switches are turned off, and
the second mode being a process in which switching control of the first low-side switches and the second high-side switches is performed in a state in which the first high-side neutral point switch and the second low-side neutral point switch are turned on, and the first low-side neutral point switch, the second high-side neutral point switch, the first high-side switches, and the second low-side switches are turned off.

10. The rotating electric machine apparatus according to claim 9, wherein:
the first neutral point switch has a rated current that is greater than respective rated currents of the first high-side switch and the first low-side switch; and
the second neutral point switch has a rated current that is greater than respective rated currents of the second high-side switch and the second low-side switch.

11. The rotating electric machine apparatus according to claim 10, wherein:
the executing unit performs the full-wave driving process when a rotation speed of a rotor of the rotating electric machine is determined to be equal to or less than a first predetermined value, performs the half-wave driving process when the rotation speed of the rotor is determined to exceed the first predetermined value, and switches from the half-wave driving process to the full-wave driving process when determined that the rotation speed of the rotor has fallen below a second predetermined value that is less than the first predetermined value after the rotation speed of the rotor is determined to have temporarily exceeded the first predetermined value.

12. The rotating electric machine apparatus according to claim 11, wherein:
the rotating electric machine also functions as a power generator.

13. The rotating electric machine apparatus according to claim 2, wherein:
the first predetermined period and the second predetermined period are each set to a period that is "90 degrees+180 degrees/N" or greater and the electrical angle half period or less.

14. The rotating electric machine apparatus according to claim 3, wherein:
the first coil and the second coil are wound around the stator core such that a spatial phase difference between the first coil and the second coil is 0 electrical degrees; and
the half-wave driving unit performs energization control of the first high-side switches and the second low-side switches while shifting the start timings for energization control of the first high-side switches and the start timings for energization control of the second low-side switches by the electrical angle half period for each of the phases of which the spatial phase coincides.

15. The rotating electric machine apparatus according to claim 2, wherein:
the half-wave driving unit
performs energization control of the first high-side switches such that at least two phases, of the N phases, of the first coil, are simultaneously energized, and
performs energization control of the second low-side switches such that at least two phases, of the N phases, of the second coil, are simultaneously energized.

16. The rotating electric machine apparatus according to claim 1, wherein
peak values of currents flowing to the first coil and the second coil are greater when the half-wave driving process is performed, compared to when the full-wave driving process is performed.

17. The rotating electric machine apparatus according to claim 1, wherein:
the first neutral point switch is a first low-side neutral point switch;
the second neutral point switch is a second high-side neutral point switch;
the rotating electric machine apparatus includes
a first high-side neutral point switch that connects, of both ends of the first high-side switch, a side opposite the connection point with the first low-side switch and the neutral point of the first coil, and
a second low-side neutral point switch that connects, of both ends of the second low-side switch, a side opposite the connection point with the second high-side switch and the neutral point of the second coil;
the half-wave driving unit performs a process for alternately performing a first mode and a second mode,
the first mode being a process in which switching control of the first high-side switches and the second low-side switches is performed in a state in which the first low-side neutral point switch and the second high-side neutral point switch are turned on, and the first high-side neutral point switch, the second low-side neutral point switch, the first low-side switches, and the second high-side switches are turned off, and
the second mode being a process in which switching control of the first low-side switches and the second high-side switches is performed in a state in which the first high-side neutral point switch and the second low-side neutral point switch are turned on, and the first low-side neutral point switch, the second high-side neutral point switch, the first high-side switches, and the second low-side switches are turned off.

18. The rotating electric machine apparatus according to claim 1, wherein:
the first neutral point switch has a rated current that is greater than respective rated currents of the first high-side switch and the first low-side switch; and
the second neutral point switch has a rated current that is greater than respective rated currents of the second high-side switch and the second low-side switch.

19. The rotating electric machine apparatus according to claim 1, wherein:
the executing unit
performs the full-wave driving process when a rotation speed of a rotor of the rotating electric machine is determined to be equal to or less than a first predetermined value,
performs the half-wave driving process when the rotation speed of the rotor is determined to exceed the first predetermined value, and
switches from the half-wave driving process to the full-wave driving process when determined that the rotation speed of the rotor has fallen below a second predetermined value that is less than the first predetermined value after the rotation speed of the rotor is determined to have temporarily exceeded the first predetermined value.

20. The rotating electric machine apparatus according to claim 1, wherein:
the rotating electric machine also functions as a power generator.

* * * * *